United States Patent [19]

Takagi

[11] Patent Number: 5,400,112
[45] Date of Patent: Mar. 21, 1995

[54] PHOTOMETRIC APPARATUS FOR A CAMERA

[75] Inventor: Tadao Takagi, Yokohama, Japan

[73] Assignee: Nikon Corporation, Tokyo, Japan

[21] Appl. No.: 47,478

[22] Filed: Apr. 19, 1993

Related U.S. Application Data

[62] Division of Ser. No. 560,745, Jul. 31, 1990, Pat. No. 5,231,448.

[30] Foreign Application Priority Data

| Aug. 7, 1989 | [JP] | Japan | 1-204300 |
| Aug. 8, 1989 | [JP] | Japan | 1-203735 |
| Sep. 1, 1989 | [JP] | Japan | 1-227221 |
| Oct. 20, 1989 | [JP] | Japan | 1-273576 |
| Nov. 9, 1989 | [JP] | Japan | 1-291459 |

[51] Int. Cl.[6] .................................. G03B 15/05
[52] U.S. Cl. .................................. 354/415; 354/431; 354/432; 354/480
[58] Field of Search ............... 354/415, 432, 431, 413, 354/480

[56] References Cited

U.S. PATENT DOCUMENTS

| 4,690,536 | 9/1987 | Nakai et al. | 354/432 |
| 4,705,382 | 11/1987 | Mukai et al. | 354/432 |
| 4,746,947 | 5/1988 | Nakai | 354/432 |
| 4,760,418 | 7/1988 | Ishizaki et al. | 354/415 |
| 4,809,030 | 2/1989 | Takagi et al. | 354/432 |
| 4,905,035 | 2/1990 | Takagi et al. | 354/432 |
| 4,998,128 | 3/1991 | Coltman et al. | 354/415 |
| 5,006,879 | 4/1991 | Takagi et al. | 354/413 |
| 5,111,231 | 5/1992 | Tokunaga | 354/432 |

*Primary Examiner*—Russell E. Adams
*Attorney, Agent, or Firm*—Shapiro and Shapiro

[57] ABSTRACT

A photometric apparatus of a camera for carrying out a multi-segmented photometry by receiving object light reflected at a film or the shutter, include a plurality of photometric elements which are disposed at positions to respectively receive reflected light from the film or the elements, are segmented in accordance with each of regions segmenting the object field, corresponding to regions of the film or the shutter, and are arranged in parallel in a predetermined direction within a mirror box so as to respectively receive light reflected with diffusion angles less than a predetermined angle from respective reflection regions of the film or the shutter. Photometric lenses are respectively positioned between the reflection regions and the photometric elements, corresponding to the photometric elements, so as to respectively direct the object light reflected at the reflection regions to the plurality of photometric elements, and are arranged in parallel so as to restrict incidence of reflected light on the photometric elements from other reflection regions.

4 Claims, 28 Drawing Sheets

FIG. 21
FIG. 22
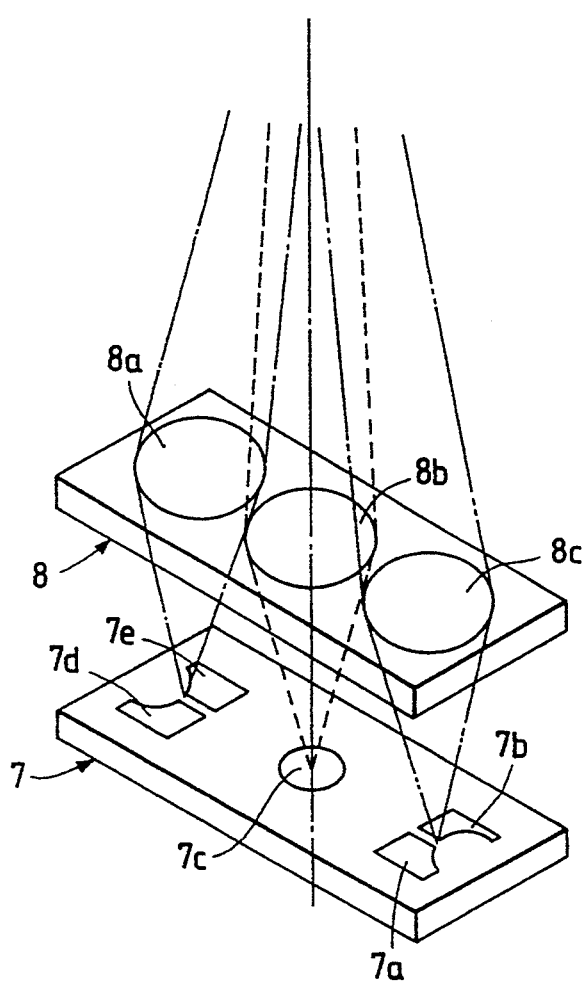
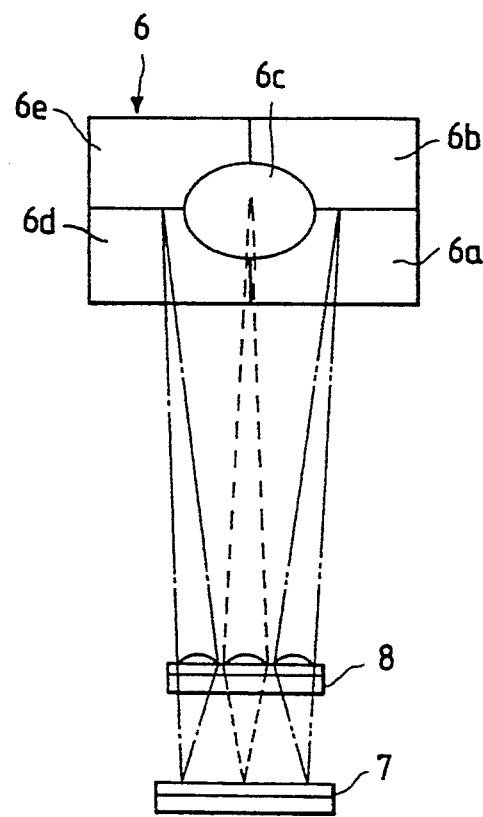

PHOTOMETRIC APPARATUS FOR A CAMERA

This is a division of application Ser. No. 560,745, filed Jul. 31, 1990, now U.S. Pat. No. 5,231,448.

BACKGROUND OF THE INVENTION

1. Field of the Invention

The present invention relates to a photometric apparatus capable of multi-segmented photometry and more particularly to a photometric element for performing photometry when receiving object light reflected at the film surface or the shutter blind surface.

The present invention also relates to a photometric apparatus used in a TTL automatic light adjusting camera, and more particularly to that used in a camera having a focal plane shutter and an automatic light adjusting unit to be used at the time of photographing using a flash.

The present invention furthermore relates to a photometric apparatus in a camera having a light emission control unit.

2. Related Background Art

A photometric apparatus capable of so-called multi-segmented photometry has been known in which the image plane is divided into a plurality of photometric regions and photometry is effected for each of the photometric regions. In this type of photometric apparatus, a plurality of photometric elements are arranged in a mirror box correspondingly to the photometric regions, and photomerry is performed by directing, respectively for each photometric region, the object light reflected at the shutter surface after passing through the photographing lens to said plurality of photometric elements via the photometric lens. Also, as a light adjusting device of an electronic flash unit, a device has been known in which the object light after passing through the photographing lens is caused to be reflected at a film surface, and light adjusting is performed by similarly directing the reflected light to a plurality of photoelectric elements, respectively, via the photometric lens.

In this specification, the term "photometry" is used to also signify the light adjusting in this type of electronic flash device.

There are however problems, as will be described below, in the conventional photometric apparatus because of the fact that a plurality of photometric elements are concentrated around a single point and that only a single photometric lens is provided.

FIG. 1 show the positional relationship, in a light adjusting device as described above, seen from the top of a camera, among a photometric lens 1, a photometric element 2 (a plurality photometric elements densely arranged around a single point) and film surface FI. In this figure, 11 denotes light entering from photometric regions, being incident upon the film surface, 12 denotes a regularly reflected light of the incident light 11, and 13 denotes dispersedly reflected light which is actually incident on the photometric element 2. In this case, the angle between the reflected light 13 and the regularly reflected light 12 (hereinafter referred to as diffusion angle) $\theta$ is rather large, to be $\theta 1$. In general, the smaller the diffusion angle $\theta$, the more intensified is the light incident on the photometric element 2, and, when the diffusion angle $\theta$ is large such as $\theta 1$, the amount of light received by the photometric element 2 is reduced because of the weakness of the light intensity of the reflected light 13. When these luminous quantities are less than the detectable limit of the photometric element 2, photometry becomes impossible.

Although the above described problem may be solved by increasing the diameter of the photometric lens 1 so as to increase the amount of light to be received, an increase in the size of the camera becomes unavoidable.

Furthermore, in FIG. 2 which describes conventional light adjusting operation, at the time of picture taking with a flash by using an electronic flash device (not shown), the luminous flux reflected from the object body is reflected at the film surface FI after passing the photographing lens LE, and the light due to the diffused reflection is directed to the photometric element 2 of the photoelectric conversion type through the photometric lens 1.

This photometric element 2 includes a main body 3, light receiving portion (not shown) fixed to the body 3 and a plurality of lead frames 4 extended from the body 3, and the body 3 is arranged with an inclination to the film surface FI. Thus the irregularly reflected light is received by the light receiving portion 5 after passing through the photometric lens 1, and a circuit portion (not shown) in the body 3 generates an electrical signal in accordance with the amount of the received light which is input into a light adjusting circuit, not shown, through the lead frames 4. The light adjusting circuit integrates the input current and, when the integrated amount reaches a predetermined amount, outputs a light emission stop signal so as to stop the light emission of the electronic flash device.

However, when an object with a high reflection rate, such as a gold-leafed folding screen, exists behind the subject (person) at the time of photographing using a flash, because of the fact that the light adjusting is effected on the basis of the reflected light, it may result in a photograph of so-called "under exposure" where the face of a person, the main subject, is darkened all over. In accordance with one aspect of the present invention, for the purpose of obtaining an appropriate exposure at any photographing condition at the time of photographing with a flash, in the specification of Japanese Patent Application No. 1-204300 in which the film surface FI is segmented for example into five regions $6a \sim 6e$ as shown in FIG. 3 and the reflected light from each region is received by each of separate light receiving portions $7a \sim 7e$ so that the light adjusting is effected on the basis of the results of light reception at respective portions.

Referring to FIG. 3, in other words, the lights reflected from the regions $6a$, $6b$ of the regions of the film surface FI are respectively received by light receiving portions $7a$, $7b$, through a photometric lens $8c$, while the reflected light from the region $6c$ is received by a light receiving portion $7c$ through a photometric lens $8b$. Furthermore, the reflected lights from the regions $6d$, $6e$ are received by light receiving portions $7d,7e$ through a photometric lens $8a$.

It should be noted that the term "photometry" in this specification is used to refer to both the so-called ordinary photometry for the exposure control and light adjusting of an electronic flash device as described above.

In the case of using a photometric element as above, however, a certain distance or more is necessary between the photometric lens and the light receiving portion to obtain a conjugate relationship between the light receiving portion and the film surface FI. In addition, the integration of the light receiving portion and the circuit portion, for the purpose of improving the light adjusting precision, results in an enlargement of the element and an increase in the number of lead frames, which can lead to a disadvantage that the camera will be increased in size because of the increase in the arrangement space for the photometric element in the camera body. In particular, the above mentioned problem is more serious in nature when employing the segmented photometric (light adjusting) system as described above, because the photometric element itself must be enlarged due to an increase in the number of the light receiving portions.

Further, because of the increasing availability of auto-focus (AF) systems of a camera in the recent years, an AF sensor module is more likely to be placed at the bottom of a camera body. From the viewpoint of the coexistence of such AF sensor module and the above described photometric element, the increase in the space for the disposition of the above described photometric element becomes even more disadvantageous.

Conventionally, furthermore, a TTL auto light adjusting control device used for the flash photographing of a camera having a focal plane shutter is provided with a single light receiving element at a position from which a portion or the whole of film surface can be supervised, and the flash apparatus is caused to emit light after fully opening the shutter. Thus, by effecting a photoelectric transfer of the light due to the reflection of an image in the object field at the film surface and by comparing the signal corresponding to the integrated amount of the light with a predetermined amount of light, the amount of light to be emitted from the flash apparatus is controlled so as to secure a certain luminosity at the film surface.

Moreover, it is also known to construct a photometric means for steady light in such a manner that the photometry is effected by segmenting the object field into a plurality of regions so as to previously detect the state of the object under the steady light level, and a correction on the basis of the result is made with respect to the light amount level to be controlled at the time of a flash photographing.

Since, however, the conventional art controls the emitted light amount from a flash apparatus as an average within a predetermined region of the film surface which is looked over by the light receiving element at the time of the light adjustment for flash photographing to obtain a certain exposure level, a wide variance in the resulting pictures is caused depending on the condition of the object. When for example a flash photographing is effected, for a main object which occupies only a small portion of the image field and which is located on a deeply spaced background, by a camera in which the range supervised by the light receiving element is the entire film surface, the light emission quantity accordingly controlled has an effect of an over-exposure for the main object because there is a wide portion at which the light from the flash apparatus is not reflected.

On the other hand, when using a camera in which the range supervised by the light receiving element is a center portion of the film surface, the exposure for the main subject may be erroneous if a flash photographing is effected under a condition where the main object is out of the center portion and the center portion is occupied by an object which is located at a distance different from that of the main object.

Furthermore, when the configuration is such that the light emission level to be controlled at the time of a flash photographing is corrected on the basis of the condition of the object which is previously detected under a steady light level with the photometry using photometric means for steady light by segmenting the object field into a plurality of regions, an appropriate correction is not likely to be effected because of the fundamental difference between the object image under steady light and the object image under flash light. In an extreme case, for example, necessary information is hardly obtained for the night-time photographing with the steady light photometry and the light adjusting are after all without any correction, whereby the above described problems remain unsolved.

As one of the proposals to eliminate the problems as above, Japanese Patent Laid-Open No. 60-15626 has been provided. This discloses a camera incorporating a stroboscope of the so-called externally light-adjusted type. In this configuration, the image field is divided into two regions, the center portion and the peripheral portion, to detect the difference in the output of these two regions by a preliminary flash, and, on the basis of the amount of such difference, one with a larger output is determined to be the main object if the difference exceeds a predetermined amount so that only the center or only the periphery is almost exclusively subjected to the light adjusting for the main flash at the time of photographing, while both are subjected to the light adjusting on an average basis if the difference is less than the predetermined value. Thus, "the stroboscope light is controlled so that an appropriate exposure is achieved at all times by eliminating the influence due to the difference in the composition of the scene to be photographed" and in an embodiment, a detection system for the object field using a preliminary flash and a detection system for the light adjustment control at the time of main flash are provided as separate systems from the photographing optical system.

However, in a system according to the above described conventional example, of the two regions divided at the time of preliminary flash, the region with larger output is always decided to be the region at which the main object is located. Therefore, when for example a gold-leafed folding screen is placed right behind the subject person, the output is larger for the region without the subject person, and, if the stroboscope light is adjusted by emphatically effecting photometry for this region at the time of main flash, a photograph will result where the subject person is underexposed. In other words, the above described invention is not only incapable of solving the conventional problems due to the difference in the reflectivity of the object body but also with such a disadvantage that the stroboscope may be controlled reversely, to a wrong direction.

Furthermore, since the detection systems in the disclosed example of the above described invention are of the type externally adjusting the light, it cannot be employed in a camera of which lenses are changeable, because the segmenting configuration of the object field in the detection system and the segmenting configuration of the object field on the film surface are changed depending on the type of lenses due to difference in the image angle.

Still furthermore, FIG. 4 shows the configuration of a conventionally known TTL auto light adjusting camera. The condition at the time of observation through the finder is such that the luminous flux (steady light) after passing through the photographing lens LE of a single-lens reflex camera is reflected by a mirror 10 at its mirror-down state as shown by the broken line and a portion of which is directed to an eye-lens 13 via a screen 11 and a pentagonal prism 12 while another portion of which is directed to an exposure calculating photometric element 15 via a photometric lens 14. And the condition of the camera at the time of photographing is such that, when for example a flash photographing is to be effected at an adverse light condition under a clear sky, both the steady light and the light emitted from a flash apparatus 16 and reflected by the object body pass through the photographing lens LE and reach the film surface FI through an opened shutter 17 because the mirror 10 is retracted to the position as shown by a solid line. The light reflected at the film surface FI is directed to a light adjusting photometric element 7 via a photometric lens 8.

In this configuration, the photometric output of the exposure calculating photometric element 15 is used in determining the exposure value. Further, the photometric output of the light adjusting photometric element 7 is used in determining the timing for stopping the emission of the flash apparatus 16. In other words, the emission is stopped when the integrated value of the output of the light adjusting photometry reaches a predetermined light amount.

In such a conventional TTL auto light adjusting camera, the emission amount may be affected depending on the percentage of the image field occupied by the main object (such as persons) or existence/nonexistence of a highly reflective object such as a gold-leafed folding screen, and the light adjusting may not be properly effected. Thus as proposed in the specification of commonly assigned Japanese Patent Laid-open No. 2-87127 photometry is effected by segmenting a light adjusting photometric element 7 into a plurality of regions; the reflectivity distribution (luminance distribution) of the object field is obtained from the photometric output of the light adjusting photometric element 7 by executing a preliminary flash prior to the main flash, and the output for each photometric region is corrected by weighting in accordance with such reflectivity distribution to accurately adjust the light.

However, since such a TTL auto light adjusting camera is designed to perform a preliminary flashing for any flash photographing regardless of the set aperture value so as to effect a correction by means of weighting, an appropriate light adjusting may not be achieved at the time of using a small aperture value because the photometry by the light adjusting photometric element 7 based on the preliminary flashing cannot be accurately performed due to an insufficiency of light.

Still furthermore, when using a conventional camera such as described above in the dark such as during a night, the following problems arise, for example when the main object is a person, even if such as the image angle of the photographing angle and the distance to the main object are the same. Specifically, in cases:

(1) where the percentage of the image plane occupied by the persons is different due such as to a difference in the number of persons or a difference in the image composition;

(2) where in a room there is a difference in the distance from the person to the background wall;

(3) where a hollowness-like state occurs or the background condition differs when there is a wall at the background or when the background is such as a landscape; or (4) where a difference occurs due to existence/nonexistence of a highly reflective portion such as a wedding cake or a gold-leafed folding screen;

there has been a problem that a difference in the emission amount occurs at the time of TTL light adjusting control due to such differences in the condition.

Further in the case such as during the daytime where it is well-lighted, if a TTL light adjusting is effected by using the photometric element 7 when an extremely bright object such as the sun enters in a portion of the image plane, there has been a problem such that an underexposure of the main object occurs because of insufficiency of light provided by the flash apparatus 16.

This is because the TTL light adjusting system is based on the principle that the steady light and the light, emitted from the flash apparatus 16, returning as the result of reflection at the object body are at the same time indiscriminately subjected to the photometry so as to stop the emission of the flashing means upon the detection of the fact that such amount has reached a predetermined amount. Thus, if a highly bright object occupies a portion of the image plane so as to increase the steady light component, the amount to be emitted by the flash apparatus is accordingly controlled to a smaller amount.

SUMMARY OF THE INVENTION

An object of the present invention is to increase the amount of light to be received by a photometric element without increasing the diameter of a photometric lens.

Another object of the present invention is to dispose photometric elements so that the increase in the size of a camera body may be restricted to the minimum.

A further object of the present invention is to eliminate the variance in the exposure for the main object which occurs due to a difference in the condition such as the position and reflectivity of the object body at the time of flash photographing even when using a camera such as a single-lens reflex camera of which lenses are changeable.

A still further object of the present invention is to provide a TTL auto light adjusting camera which employs a system for correcting the photometric output at the time of light adjusting in accordance with the reflectivity distribution in the object field, and which is capable of an appropriate light adjusting even when the aperture is controlled to be small.

In view of the problem that a conventional TTL light adjusting system is largely affected by the main object and its background, a still further object of the present invention is to solve this problem and to provide a light emission control device, of a camera capable of TTL light adjusting operation, which is without exception able to effect an appropriate light adjustment.

A description will be given below with reference to FIG. 5A showing a first embodiment. The present invention is applicable to a photometric apparatus of a camera in which the image plane is segmented into a plurality of photometric regions and a plurality of photometric elements 18a~18e are arranged correspondingly to each photometric region in a mirror box MB (see FIG. 6) and which effects photometry by directing, after passing through the photographing lens, the light reflected by the reflecting regions 6a~6e corresponding to the photometric regions at the film surface FI or at the shutter surface respectively to the plurality of photometric elements 18a~18e via photometric lenses 19a~19e. And the technological problem as described above is solved by arranging in parallel in a predetermined direction said plurality of photometric elements 18a~18e so that they receive the light reflected at the reflecting regions 6a~6e, with angles less than a predetermined diffusion angle, and by arranging in parallel in a predetermined direction a plurality of photometric lenses 19a~19e corresponding to the plurality of the photometric elements 18a~18e so as to restrict the incidence on each photometric element of the reflected light from other reflecting regions.

Since both the photometric elements 18a~18e and the photometric lenses 19a~19e are arranged in parallel in a predetermined direction, they do not require a large space in the narrow interior of the mirror box and do not cause an enlargement in the size of the camera.

In this way, the object body light reflected at the reflecting regions 6a~6e such as of the film surface FI is caused to be incident on the plurality of photometric elements 18a~18e via the photometric lenses 19a~19e. The light incident on each of the photometric elements of the reflected light from other reflecting regions is restricted by means of the photometric lenses 19a~19e, and each of the photometric elements 18a~18e respectively receives the reflected light reflected at the reflecting regions 6a~6e at angles less than the predetermined diffusion angle. Thus the intensity, i.e., the amount of the light incident on each of the photometric element is increased compared to a conventional configuration, and it is possible to accurately perform the photomerry.

A description will now be given with reference to FIGS. 13 and FIGS. 14A, 14B which show a second example. The present invention may be applied to a photometric element of a camera having: a body 22 of the photometric element 21 disposed at the bottom of the camera body 9 or at the upper portion of the AF sensor module 20 placed at the bottom thereof, inclined at an acute angle with respect thereto, and with an inclination to the film surface FI or to a shutter blind surface; light receiving portions 21a~21e (see FIG. 14A) which are fixed on the body 22 and receive the object body light reflected, after passing through the photographing lens LE, at the film surface FI or at the shutter blind surface; and a plurality of lead frames 23 which are extended from the body 22 to transmit electrical signals in accordance with the amount of light received by the light receiving portions 21a~21e.

The above described technological problems are solved by making the lower surface 22b of the body 22 generally parallel to the bottom surface of the camera body 9 or to the upper surface 20a of the AF sensor module 20 and by extending the signal transmitting lead frames 23 to a portion other than the lower portion of the photometric element body 22.

By the configuration as described above, it is possible to reduce the space necessary for the disposition of the photometric element within the interior of the camera body 9, and an increase in the size of the camera may be controlled to the minimum.

Furthermore, the present invention provides the following configuration for an auto light adjusting apparatus in order to achieve the aforementioned object.

A plurality of photoelectric conversion means are provided at a position from which the film surface can be supervised such that photometry is possible by segmenting the subject field into a central portion and a plurality of peripheral portions; the flash apparatus is caused to emit a preliminary flash immediately before the opening of the focal plane shutter so as to catch the light reflected at the shutter blind surface of the object image caused by such flash light; and the amount respectively integrated is detected as the object field reflection rate for each region due to flash emission. By synthetically processing the detected object field reflection information for each region, the degree of weighting for each segmented region is decided so as to achieve the most appropriate exposure for the main object. Subsequently, the flash apparatus is caused to emit a main flash immediately after the opening of the shutter and the light reflected at the film surface is received by the same plurality of photoelectric conversion means as described above so that an integration by means of addition is performed after effecting the previously decided weighting for their outputs, and the result is compared with a predetermined value to decide the timing at which the emission of the flash apparatus is to be stopped, and the light adjusting for the main flash is completed.

Furthermore, the weighting means of the auto light adjusting control device according to the present invention sees whether there is a bright region at which the object field has a reflection rate exceeding an upper limit value and whether there is a dark region having a reflection rate less than a lower limit value. And, if there is seen any bright region or dark region, such bright regions and dark regions are ignored and a weighting value is calculated for each of the rest of the regions, while, if neither a bright region nor a dark region is seen, weighting values are calculated respectively for all the regions.

Light adjusting control sequence of a fundamental auto light adjusting device of the present invention will now be described by way of FIGS. 18~20.

Referring to FIG. 18, after releasing the shutter, a mirror up and stopping down operation is effected at step S1. Preliminary flash by means of the flash apparatus, i.e., an emitting operation before the film exposure by a main flash is then carried out at step S2. At step S3, the reflected light, from the object field, of the light due to the preliminary flash is caused to be reflected at the shutter blind surface (a surface having a reflection characteristic almost identical to that of the film surface), and is metered by the segmented light receiving element before a main flash. A light adjusting operation by means of the light receiving element is carried out also in this preliminary flash, and, when the amount of the flash emitted reaches a predetermined amount, an emission stop signal is output to end the preliminary flash. As a result, since the reflection rate distribution of the object field may be detected by the preliminary flash before the emission of main flash, the position of the main object within the object field may be predicted with a high certainty by processing the photometric output and an appropriate control is possible if the main flash is controlled by taking such a reflection rate distribution into the consideration.

At step S4, for a plurally-segmented light receiving elements to be used for light adjustment in the main flash, a weighting value is assigned to each light adjusting light receiving element on the basis of the distribution of the reflection rate within the object field detected by the preliminary flash, i.e., the gain from the light receiving element output is changed accordingly. Note that such a light adjusting light receiving element is segmented into the same configuration as the light receiving element used in measuring the reflection rate distribution and may constituted by a light receiving element which is used for both the reflection rate measurement and the light adjustment or there may be two independent light receiving elements for these purpose.

Since, in steps S1~S4, a preliminary flash, reflection rate distribution detection and calculation of weighting values are performed rapidly immediately before the shutter is opened at step S5 so that only a few msec time interval is necessary between the preliminary flash and the the main flash to be performed at step S6, the fact that the emission has actually occurred twice is not sensed and a better impression is given even when a person is the subject to be photographed. In addition, in the case of using a single-lens reflex camera, the fact that the time interval between the two emissions is short leads to an advantage that the so-called time lag, between pressing of the shutter release button and opening of the shutter, is almost unchanged.

At steps S7,S8, the main flashing operation by the flash apparatus is carried out in which a plurality of segmented light receiving elements for the light adjusting to which weighting values are assigned on the basis of preliminary flash receive the reflected light from the film surface, and the signals from the plurality of segmented light receiving elements are integrated by means of integrating means and, when a predetermined integration amount is reached, an emission stop signal is outputted to complete the light adjusting.

Next, an actual method (algorithm) by which weighting values for the regions segmented at the time of the main flash are determined from the reflection rate distribution of the object field obtained from the preliminary flash will be described hereinafter by way of FIGS. 19, 20 and 4.

FIG. 19 is a block diagram showing a circuit which determines weighting values by the preliminary flash.

FIG. 20 is a flowchart showing the process through which weighting values for the segmented regions are determined. Note that the flow as shown in FIG. 20 may be programmed into a microcomputer or the like. FIG. 4 is a cross section of a camera.

First of all, when at step S12 the release button 24 (FIG. 19) of the camera is released, the main mirror 10 (FIG. 4) is brought into a mirror-up state and at the time the aperture of the lens is stopped down to a photographing aperture value. Program then proceeds to step S13 at which the preliminary flash is emitted by the flash apparatus 16. The light of the preliminary flash reflected from the object reaches the photometric element 7 after passing through the photographing lens LE (FIG. 4) and reflected at the shutter (FIG. 4).

The element surface of the photometric element 7 is segmented into five regions 7a~7e as shown in FIG. 19 so that the object field is segmented into five regions in measuring the light. A photometric current occurring at each region is transmitted to weighting value calculation means 26 where the integration of the reflected light from the object body is carried out at step S14. The integrated amount of each element is set as Cn (n=1~5).

At step S15, the reflection rate distribution Rn is obtained from Cn as follows:

$$Rn = \frac{Cn}{\sum_{n=1}^{5} Cn} \quad (n = 1 \sim 5) \quad (1)$$

During steps S16 to S22, operations are carried out to extract photometric regions at which the reflection rate distribution Rn (n=1~5) is very high (Rn>0.8) and photometric regions at which it is very low (Rn<0.1) and these are to be cut off. The reason for this is that, at a photometric region with a very high Rn, there is presumably behind the main object (a person) an object such as a gold-leafed folding screen or a white wall which gives an adverse effect on the TTL light adjusting. Further, at a photometric region with a very low Rn, the background of the main object (a person) is presumably for example a landscape which may evade photometry, the result being another factor to cause an adverse effect to the TTL light adjusting process.

In such cutting out, the reflection rate distributions Rn (n=1~5) for the cut out regions are replaced by 0 and are not counted in the subsequent calculations.

At step S23, by using the reflection rate distributions Rn after the cut-out operation, weighting values Dn are calculated as follows:

$$Dn = \frac{Rn}{\sum_{n=1}^{5} Rn} \quad (n = 1 \sim 5) \quad (2)$$

The program then proceeds to steps S24 and S25 at which said weighting values Dn are converted correspondingly into voltages En as follows:

$$En = K(1 - Dn)Er \quad (3)$$

and are outputted to a weighted light adjusting circuit 3. Note that "K" represents a value corresponding to an ISO information and is inputted at step 24 by means of an ISO information input means (FIG. 19). Further, Er is a predetermined constant voltage.

Upon the inputting of the voltage En corresponding to the weighting value into a weighting light adjustment circuit 28, the main flashing by the flash apparatus 16 is carried out at step S26. The reflected light from the object body due to the main flash reaches the photometric element 7 as shown in FIG. 4 through the lens LE (FIG. 4), reflected at the film surface FI (FIG. 4) and through the photometric lens 8 (FIG. 4).

The reflected light metered in segments by the photometric element 7 is integrated at step 27, being weighted at the weighting light adjustment circuit 28 (FIG. 19). Thus, when the total of the integrated amount for the five regions reaches a predetermined amount, the emission stop signal is supplied and the emission by the flash apparatus 16 is stopped by way of a flash control means 29, and the program then proceeds to its end at step S28.

As is apparent from the foregoing description, when for example there is an output only from the center one of the segmented regions at the time of photographing during a night and there are no outputs from the other peripheral segments, the weighting is carried out such that only the central segmented photometric element 7c is used in the light adjustment. Furthermore, when for example one region is outstandingly bright though outputs are detected from all or most of the regions, the probability of this region being the main object is presumed to be very low and the weighting is carried out in such a manner that this one does not contribute to the weighting, thus improving the probability of the main object being appropriately exposed.

The fundamental auto light adjusting sequence of an auto light adjusting control device of the present invention may be carried out as described above.

The present invention will now be described by way of FIG. 28. The present invention comprises: a flash apparatus 16 capable of both a preliminary flashing to detect the reflection rate distribution of the object field and a main flashing for the flash photographing of the object field; a light meter 30 which, by segmenting the object field into a plurality of regions, meters each of the reflected lights from said plurality of regions due to the flash apparatus 16 and outputs respective photometric signals; a weight amount calculator 26 for obtaining the weight amount to adjust the photometric signals provided by light meter 30 at the time of main flashing on the basis of the photometric signals form the light meter 30 obtained at the time of the preliminary flash; a light adjuster 28 for stopping the emission of the flash apparatus 16 in accordance with the photometric signals from the light meter 30 at the time of the main flashing and with the weight amount from the weight amount calculator 26; an aperture set device 31 for setting the aperture value before the photographing operation; a discrimination device 32 for checking if the set aperture value provided by the aperture set device 31 exceeds a predetermined value; and a flash controller 29 which, when it is seen by the discrimination device 32 that the set aperture value exceeds the predetermined aperture value, carries out the main flashing without a preliminary flashing and which, when it is seen by the aperture set device 32 that the set aperture value is smaller than the predetermined aperture value, carries out the main flashing on the basis a preliminary flashing.

When it is seen by the discrimination device 32 that the set aperture value is larger than a predetermined aperture value, it also possible to adjust the photometric output on the basis of a predetermined reflection rate distribution. Or, when the aperture value calculated by a programmed exposure mode is larger than a predetermined aperture value, the set aperture value may be limited to the predetermined aperture value.

According to the present invention, when the set aperture value is less than a predetermined value, i.e., in the case where the aperture is relatively large, a preliminary flash is carried out and weight amounts related to the reflection rate distribution of the object field are calculated so as to adjust the light at the time of main flashing in accordance with such weight amounts. Thus the photometric output of the regions with high reflection rate within the object field are less likely to take a part in determining the emission amount during the light adjustment and a larger part is taken in determining the emission amount with a decrease in reflection rate. However the amount of light reaching the photometric elements is small when the aperture value is small and the output value at that time is not reliable. Thus, when the aperture value is regarded as small, the light adjusting using the reflection rate distribution obtained from the preliminary flash, i.e., on the basis of weight amounts is not carried out.

Further, according to the present invention, at the time of using a smaller aperture, the photometric output may be corrected in accordance with a predetermined reflection rate distribution.

Furthermore, according to the present invention, the set aperture value may be limited to a predetermined value even when the aperture value calculated by a programmed exposure mode is a small one so that a correction of the photometric output may be carried out at all times on the basis of the reflection rate distribution of the object field to effect a more appropriate light adjusting for the object.

In a further development, a light emission control device according to the present invention comprises:

a flash controller for selectively causing the flash apparatus to carry out both a main emission for the exposure and a preliminary emission for detecting the luminance condition of the object field in advance to the main emission;

a light adjusting device, having segmented light adjusting elements, for controlling the emission of the flash apparatus on the basis of the output of the light adjusting elements;

a photometric apparatus for metering the light from the object field;

a field categorization apparatus for categorizing the luminance condition of the object field into at least a first condition and a second condition by using the output from said photometric apparatus; and a controller which, when the object field is categorized as being in said first condition by the field categorization means, causes said flash controller to prohibit a preliminary emission by said flash apparatus and executes weighting process for the outputs of said segmented light adjusting elements on the basis of said photometric apparatus and which, when said object field is categorized as being in said second condition, causes said flash controller to allow a preliminary emission by said flash apparatus and executes weighting process for the outputs of said segmented light adjusting elements on the basis of the result therefrom.

In the present invention, the object field is categorized by a field categorization apparatus according to its detected luminance condition and, when the object field is categorized as being highly luminous (first condition), a region of the object field at which a high luminance exists is extracted from photometry of the steady light so that such a region may be cut out or assigned with a lower weighting value. Thus a TTL light adjusting operation for an appropriate emission may be achieved by the controller.

Further, although the photometry of a preliminary emission in a bright scene is difficult in terms of amount of light because the aperture is smaller at the time of photographing and the ratio of the flash to the steady light also decreases, problems in a bright scene may be solved without executing a preliminary emission by using the system as described above.

When the object field is categorized as being dark (second condition) by the field categorization apparatus, a preliminary emission is carried out by the flash apparatus and the reflected light is metered to detect the reflection rate distribution of the object field. And, since regions of the object field which are considered to have an adverse effect to the TTL light adjusting operation are extracted and such regions are cut out or treated with lower weight at the time of the light adjusting operation for the main emission, the TTL light adjusting operation capable of an appropriate emission control may be achieved also in this case by the flash controller.

Since, in this manner, the camera automatically categorizes the object field by the field categorization means so as to automatically decide whether a preliminary emission is to be effected, the automatic changeover of the weighting method between a steady light system and a preliminary emission system is possible at the time of light adjusting so that an appropriate flash emission may be effected to all the regions, from a bright region to a dark region.

BRIEF DESCRIPTION OF THE DRAWINGS

FIG. 11A shows a photometric apparatus according to the present invention and FIG. 11B shows a conventional photometric apparatus;

FIGS. 13~17 are views illustrating the second embodiment of the present invention, wherein FIG. 13 is a cross section of a camera showing the disposition of the photometric element according to the present invention, FIG. 15 is perspective view showing the mounting condition of the photometric element, FIG. 16 is a view illustrating the advantage in the case of not providing lead frames at the bottom end of the package, and FIG. 17 is a front view of the photometric elements showing a modification;

FIGS. 18~20 are diagrams showing the third embodiment of the present invention, wherein FIG. 18 is a flowchart showing the light adjusting control sequence of an auto light adjusting control apparatus, FIG. 19 is a block diagram of the auto light adjusting control apparatus, and FIG. 20 is a flowchart showing the preliminary flash sequence of the auto light adjusting control apparatus;

FIGS. 21~26 are views showing the third embodiment of the present invention, wherein FIG. 21 is a perspective view showing the photometric optical system of an auto light adjusting control apparatus, FIG. 22 is a front view of the apparatus shown in FIG. 21, FIG. 23 is a circuit diagram of the auto light adjusting control device, FIG. 24 is a flowchart corresponding to the above circuit diagram, FIG. 25 is a timing chart corresponding to the same circuit diagram, and FIG. 26 is a circuit diagram showing in detail a portion of the circuit diagram shown in FIG. 23;

FIGS. 29~33 are views illustrating the fifth embodiment of the present invention, wherein FIG. 29 is a block diagram showing the overall configuration, FIG. 30 is a diagram showing in detail the weighting light adjustment circuit, and FIG. 31~33 are flowcharts showing the processing procedure;

DESCRIPTION OF THE PREFERRED EMBODIMENTS

A description will now be given by way of FIGS. 5~12 with respect to an embodiment in which the present invention is applied to a light adjusting device of an electronic flash apparatus.

Figure 6:
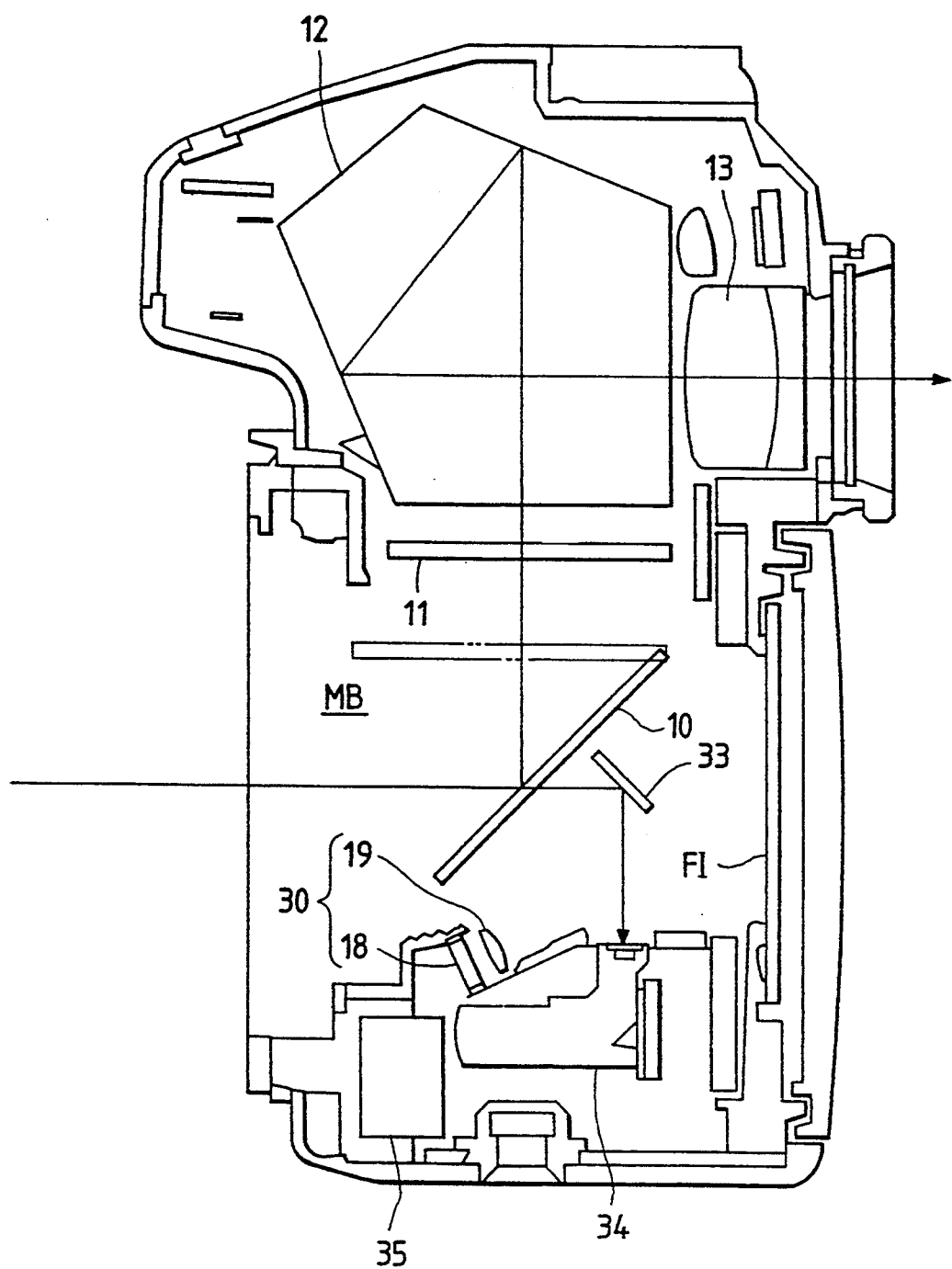
FIG. 6 is a cross section of a camera.

FIG. 6 is a cross section of a camera; a portion of the object light having passed through a photographing lens, not shown, is reflected by a main mirror 10 disposed in a mirror box MB and may be observed at an ocular 13 via a screen 11 and a pentagonal prism 12 which comprise a finder optical system. On the other hand, the object light passed through the main mirror 10 is reflected at a submirror 33 and is directed to a focus detection sensor 34 where the focus controlling state of the object body is detected. Numeral 35 denotes a lens driving mechanism for bringing the photographing lens to a focus.

When photographing operation is performed by using an electronic flash apparatus (not shown), the main mirror 10 is retracted as shown by the double-dashed line from the optical axis of the photographing lens, and the object light having passed through the photographing lens reaches the film surface FI for the exposure. Further, the object light reflected at the film surface FI is directed to a light adjusting photometric apparatus 30 which is disposed at the lower portion of the mirror box MB.

Figure 5A:
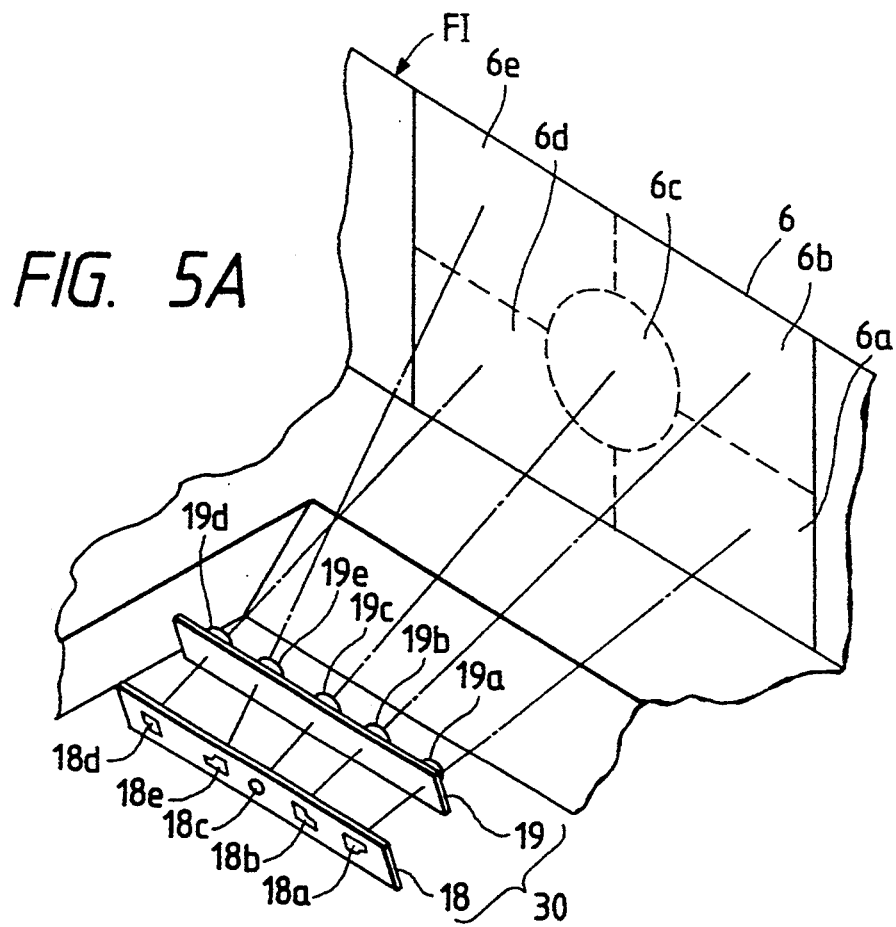
FIG. 5A is a perspective view showing the overall configuration of the photometric apparatus according to the first embodiment of the present invention.

This photometric apparatus 30 has a configuration as shown in FIG. 5A.

Figure 7:
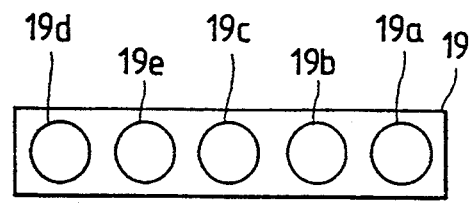
FIG. 7 and FIG. 8 are front views showing the arrangement of photometric lenses and photometric elements, respectively.
Figure 8:
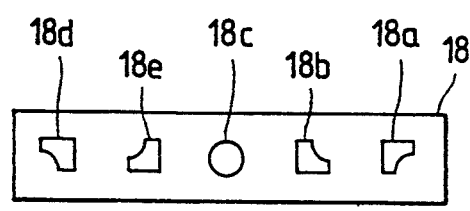

Referring to FIG. 5A, in a camera of the present invention, the image plane is segmented into five regions (photometric regions) and photometry is to be carried out for each of the regions; numeral 6 denotes an exposure region of the film FI corresponding to a piece of photograph while each of 6a~6e denotes a reflection region within this exposure region 6, and the light from each of the photometric regions is respectively reflected at the reflection regions 6a~6e. As shown in FIG. 7, a photometric lens 19 is a bond lens integrally retaining five individual photometric lenses 19a~19e correspondingly to the reflection regions 16a~16e on the film surface FI, and these photometric lenses 19a~19e are arranged in parallel and transversely to the camera.

Furthermore, on a photometric element retaining member 18, photometric elements 18a~18e which are in the same shapes as the reflection regions 6a~6e, respectively, are retained in parallel transversely to the camera.

A camera such as of the present embodiment which carries out an auto focusing control has only a small empty space inside the mirror box because of the fact that the focus detection sensor 34 and the lens driving mechanism 35 are located below the mirror box MB as shown in FIG. 6. By arranging both the photometric lenses 19a~19e and the photometric elements 18a~18e in parallel and transversely to the camera, an increase in the size of the camera may be prevented without requiring a large disposition space even within the narrow interior of the mirror box MB.

Thus the light reflected at each of the reflection regions 6a~6e is received by the photometric elements 18a~18e, respectively, via photometric lenses 19a~19e, and at the same time the incidence of the reflected light from other reflection regions on each of the photometric elements is restricted by effect of these photometric lenses 19a~19e.

Figure 1:
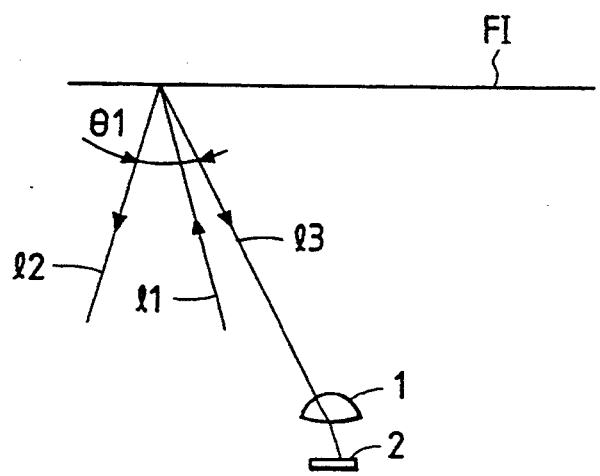
FIG. 1 is a view showing a conventional example and illustrating the diffusion angle of reflected light to be received by photometric elements.
Figure 2:
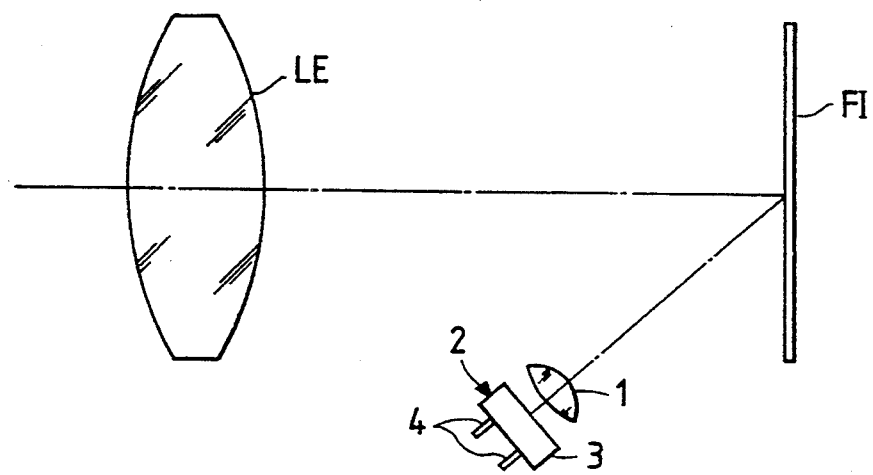
FIG. 2 is a view illustrating an example of conventional light adjusting system.
Figure 9:
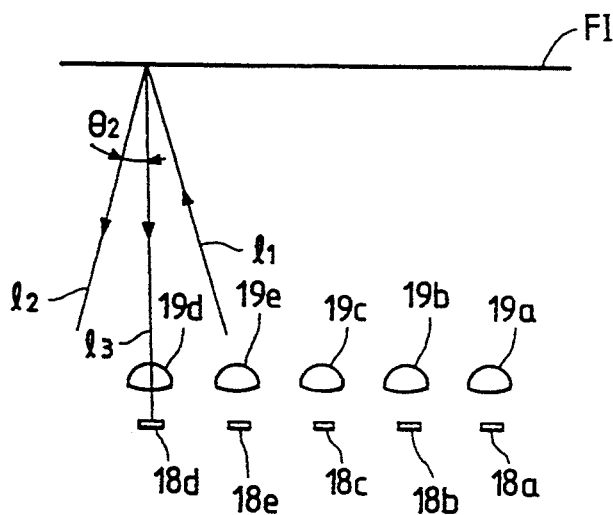
FIG. 9 is a view illustrating the diffusion angle of the reflected light to be received by the photometric elements.

FIG. 9 is a view as seen from the top of the camera showing the positional relationship among the photometric lenses 19a~19e, photometric elements 18a~18e and the film surface FI. 11 denotes the object light incident on the reflection region 6d, 12 denotes light regularly reflected thereat, and 13 denotes irregularly reflected light which is incident on the photometric element 18d. With this configuration, it can be seen that the aforementioned diffusion angle θ becomes θ2 which is smaller than the conventional θ1 (see FIG. 1).

Figure 10:
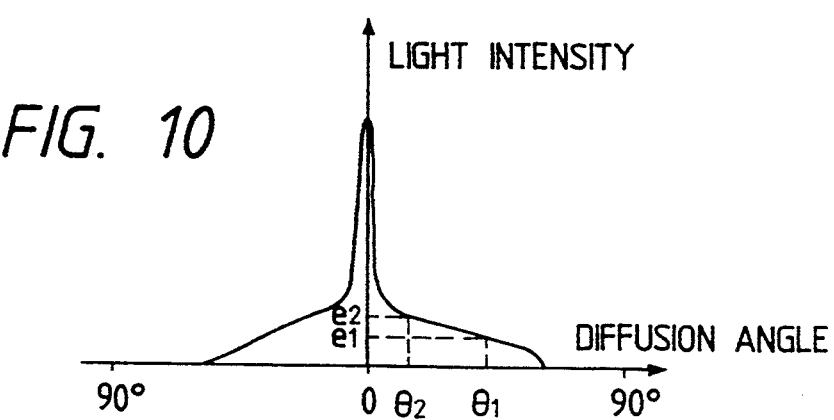
FIG. 10 is a graphic presentation showing the intensity of the light with respect to the diffusion angle.

FIG. 10 shows how the intensity of the light incident on the photometric element 18 is changed with the diffusion angle θ. According to this, while the intensity e1 is weak when the diffusion angle θ is large as indicated by θ1 which is the case in a conventional art, the intensity e2 of the present embodiment is more intensified than the conventional art because the diffusion angle θ is smaller as indicated by θ2. Thus the amount of the light incident on the photometric element 18d is increased and the photometry (light adjusting) may be carried out with a certainty.

Figure 11A:
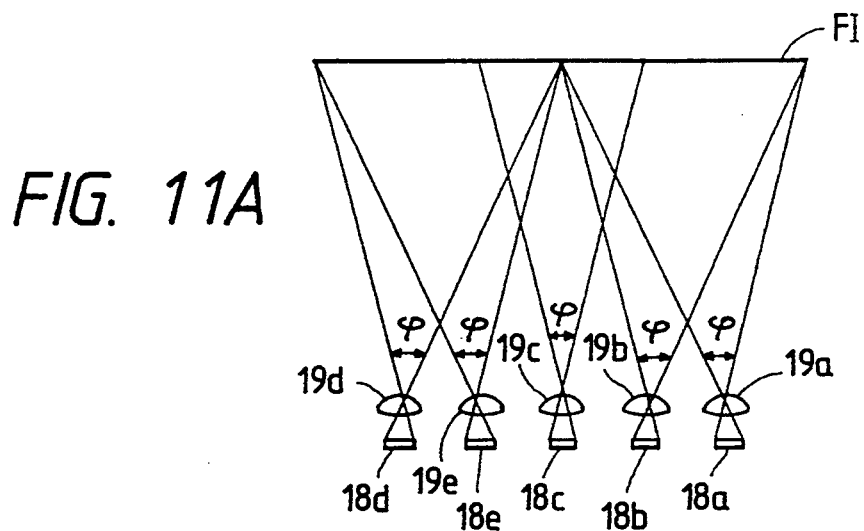
FIGS. 11A and 11B are views illustrating the angle of the light incident on the photometric lens where
Figure 11B:
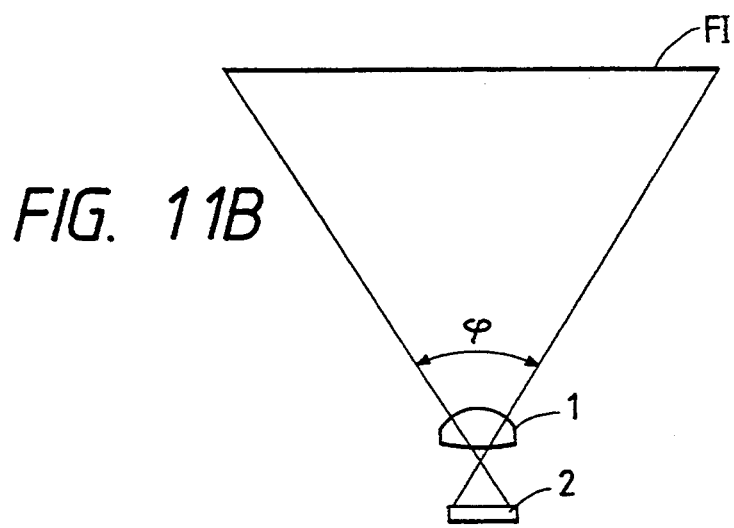

Further, since the incidence of the reflected light on each of the photometric element from other reflection regions is restricted because of the photometric lenses 19a~19e, there is no overlap between neighboring photometric elements so that a segmented photometry may be possible with high accuracy. Furthermore, as shown in FIG. 11A, since the angle φ by which the reflected light is incident on the photometric lenses 19a~19e from the reflection regions 16a~16e is smaller compared to the case of using a single photometric lens as in a conventional art (FIG. 11B), there is also an advantage that the aberration is smaller, improving the image forming ability.

In addition, in the present invention, since the photometric elements 18a~18e and photometric lenses 19a~19e are respectively retained as an integrated body, it is not necessary to position them individually and thus it is possible to improve the efficiency of the positioning operation.

Figure 12A:
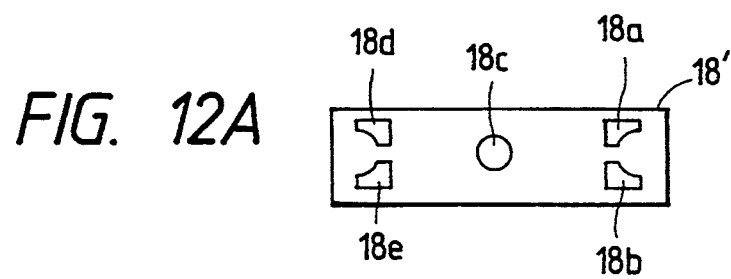
FIGS. 12A and 12B are front views respectively showing variations of arrangement for the photometric elements and for the photometric lenses.
Figure 12B:
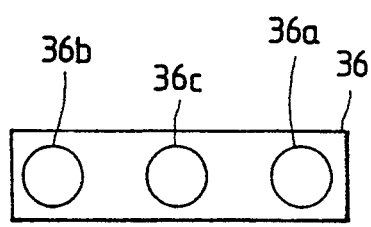

Note that, although the photometric elements 18a~18e and the photometric lenses 19a~19e in the example as shown above are respectively arranged in parallel on a straight line, they need not be arranged on a straight line. Furthermore, while an example has been shown in which the photometric elements 18a~18e and photometric lenses 19a~19e correspond to each other on a one-to-one basis, it is also possible to have a configuration in which photometric elements 18a~18e and the photometric lenses 36a~36c are arranged for example as shown in FIGS. 12A and 12B so that the reflected light from the reflection regions 6a,6b is directed to the photometric elements 18a,18b through the photometric lens 36a while the reflected lights from the reflection regions 6d, 6e is directed to the photometric elements 18d, 18e through the photometric lens 36b.

Moreover, the photometric lenses and the photometric elements may be retained on separate members, and in addition the segmenting configuration and the number of segments of the image plane are not limited to those described above.

Figure 5B:
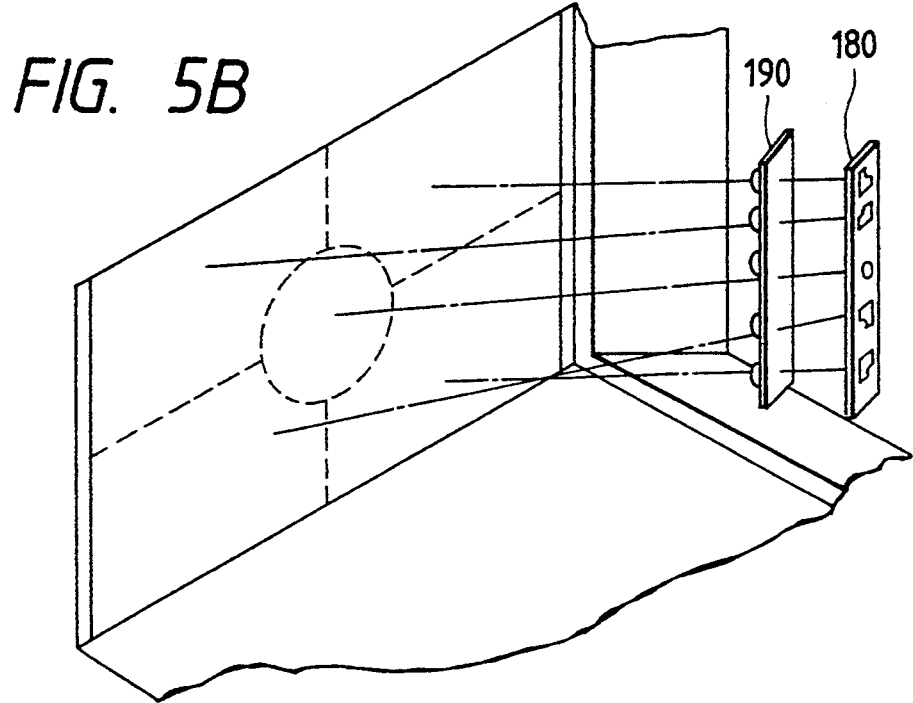
FIG. 5B is a perspective showing a modification of the first embodiment.

Still further, although the photometric elements and the photometric lenses in the embodiment as described above are arranged in parallel and transversely to the camera at the lower portion of the mirror box MB, it is also possible as shown in FIG. 5B to arrange a photometric element retaining member 180 and the photometric lenses 190 in parallel and vertically to the camera along the side wall of the camera within the mirror box MB. Still furthermore, while the description has been given with respect to a light adjusting device which carries out the light adjusting of the electronic flash apparatus on the basis of the light reflected at the film surface, the present invention may also be applied to an ordinary photometric apparatus which carries out the exposure control by receiving the light reflected at the shutter surface.

According to the present invention, a plurality of photometric elements are disposed in parallel in a predetermined direction so as to respectively receive the reflected light reflected with less than a predetermined diffusion angle at respective reflection regions of the film surface or of the shutter surface, and a plurality of photometric lenses are arranged in parallel in the above described predetermined direction correspondingly to the plurality photometric elements. Since incidence on each photometric element of reflected light from other regions is thereby restricted, photometric elements corresponding to peripheral photometric regions are also stricken by reflected light with smaller diffusion angles, in which case the quantity of incidence can be increased. Photometry (light adjusting) is thus possible with a certainty without increasing the size of a camera.

Furthermore, because of the above described restriction on incidence from other reflection regions, there are no overlaps among the neighboring photometric regions and a plurally segmented photometry becomes possible with high accuracy. In addition, since the angles of incidence on the photometric lenses from each of the reflection regions on the film surface or on the shutter surface become smaller compared to a case of using a single photometric lens such as in a conventional configuration, there is another advantage that the image forming ability is increased due to a smaller aberration.

A second embodiment of the present invention will now be described with reference to FIG. 13~FIG. 17.

Figure 13:
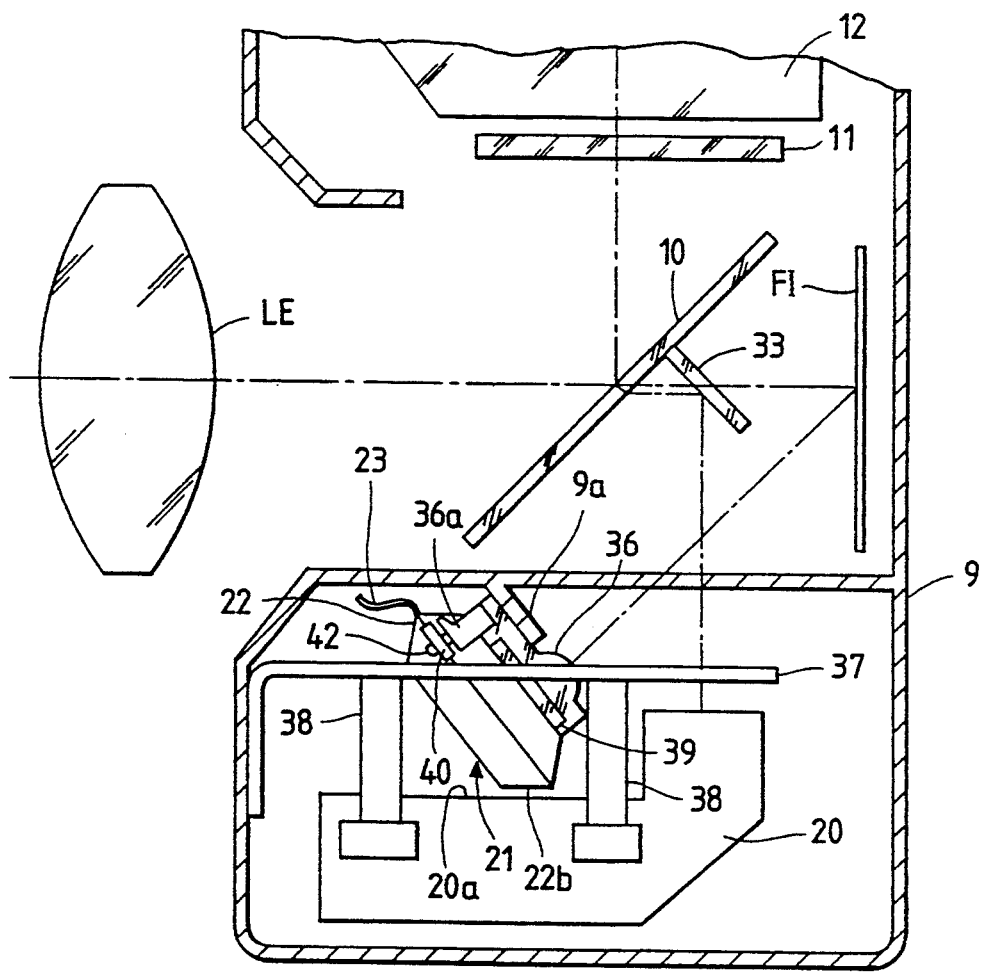

FIG. 13 is a cross section of a camera. A portion of the object light, having passed through the photographing lens LE and being directed into the interior of the camera body 9, is reflected at a main mirror 10 and is directed to an ocular, not shown, through a screen 11 and a pentagonal prism 12 which constitute a finder optical system. On the other hand, another portion of said object light is reflected at a submirror 33 after passing through the main mirror 10 and is directed to an AF sensor module 20 through a hole 37a of a substrate 37 (see FIG. 15) which is fixed within the interior of the camera body 9. In this configuration, the AF sensor module 20 is retained at the bottom of the camera body in a suspended condition from said substrate 37 via columns 38. Thus a known focus detection operation is carried out on the basis of the incident object light.

Further at the time of photographing using an electronic flash apparatus, not shown, the illuminating light of the flash apparatus, after being reflected at the object, is directed into the interior of the camera body 9 through the photographing lens LE. At this time, since the main mirror 10 and the submirror 33 are integrally retracted from the optical path of the photographing lens LE, the incident light is directed to the film located at the rear portion of the camera body 9 and is reflected at the film surface FI. And some of the irregularly reflected light thereat is incident on photometric element 21 via photometric lens 36 fixed with an inclination on a fixed portion 9a of the camera body 9 and via a filter 39.

Figure 3:
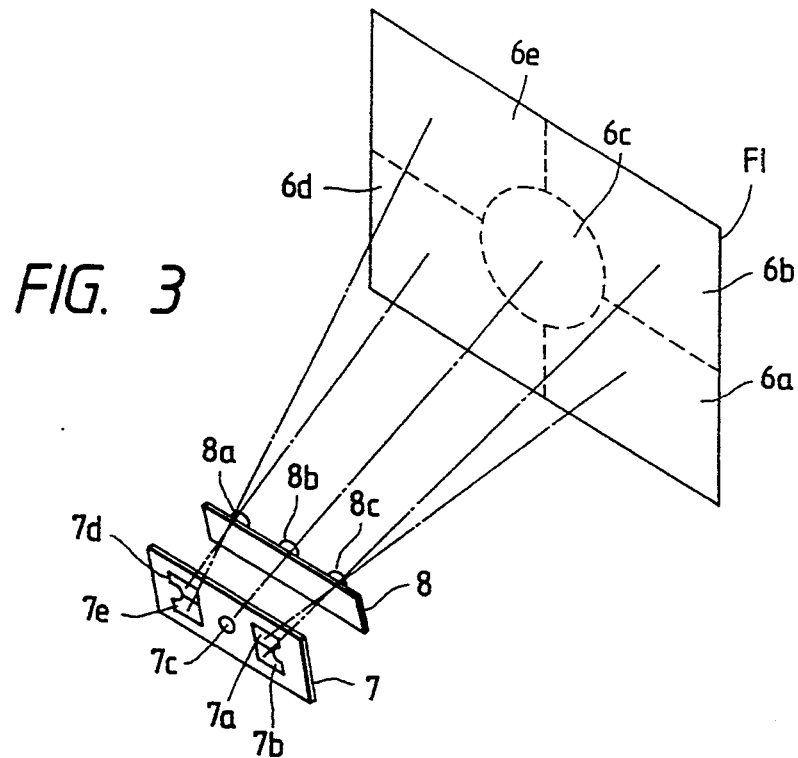
FIG. 3 is a view illustrating a segmented light adjusting system.
Figure 14A:
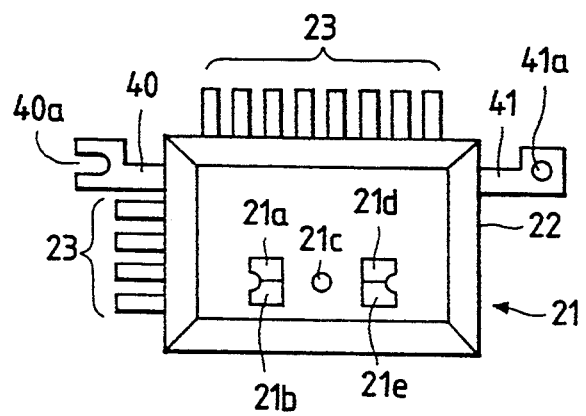
FIG. 14A is a front view of the photometric element.
Figure 14B:
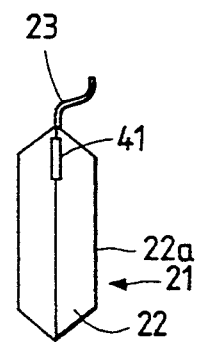
FIG. 14B is a side view of the same as seen from the right side.

FIG. 14A is a front view of the photometric element 21, and FIG. 14B is a side view from the right side of the same. A transparent plastic mold package (body) 22 in a rectangular shape is cut at its upper and lower ends and at its left and right (the transverse direction of the camera) ends so as to form mountain-shaped ends thereat, and at the interior of which light receiving portions 21a~21e and a circuit portion (not shown) in a form of IC are provided. As has been described with reference to the conventional art, the light receiving portions 21a~21e are designed to respectively receive the reflected light from five regions 6a~6e (FIG. 3) of the film surface FI and are respectively fixed at positions displaced downward from the center of the package 22 as shown in the figure.

Further, a plurality of lead frames 23 are respectively projected from the upper end portion and the left end portion of the package 22, and their distal ends are bent so as to be in the same plane as a surface 22a of the package 22 as shown in FIG. 14B. Furthermore, lead frames 40, 41 for the fixing and positioning are projected from the left and right end portions of the package 22 at positions displaced upwardly from the center of the package 22, and a fork-like portion 40a is provided at the lead frame 40 while a bored portion 41a is formed at the distal end of the lead frame 41.

Figure 15:
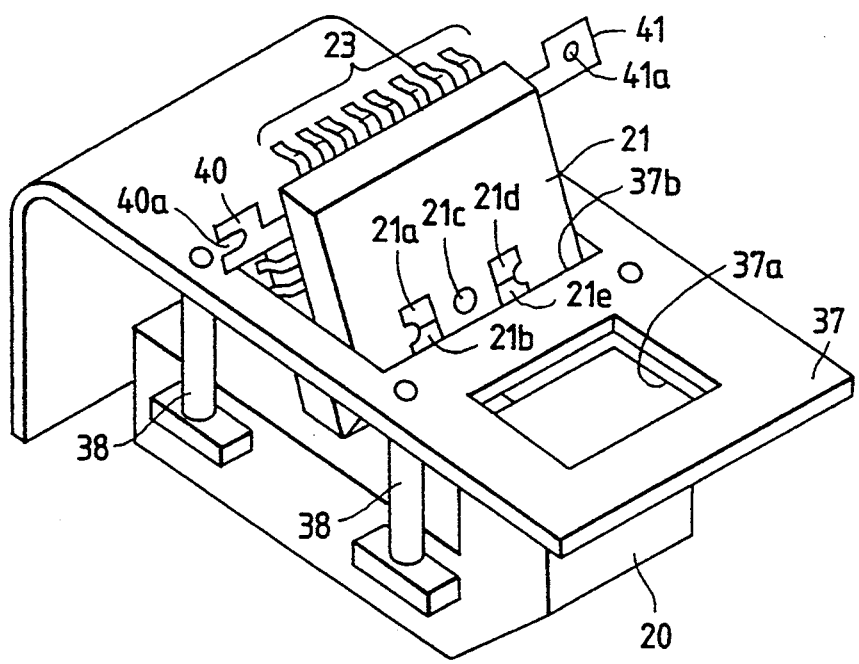

Referring to FIG. 13, a pair of extended portions 36a (only one being shown) are formed on the above described photometric lens 36 at both ends thereof that are transverse to the camera and each of the extended portions 36a is formed with a boss 42 which protrudes obliquely frontward therefrom. The photometric element 21 is inserted into a window portion 37b of the substrate 37 as shown in FIG. 15, and the fork-like portion 40a of the lead frame 40 is caused to engage one of the above described bosses 42 while the bored portion 41a of the lead frame 41 engages with the other boss (not shown). Package 22 is thereby retained at the upper portion of the AF sensor module 20 with an inclination with respect to the film surface FI.

Thus, the object light reflected respectively at the regions 6a~6e (FIG. 3) of the film surface FI, after passing through the photometric lens 36 and the filter 39, is respectively received by the light receiving portions 21a~21e through the plastic package 22. At the circuit portion in the package 22, electrical signals in accordance with the amount of the light received at the light receiving portions 21a~21e are inputted into a light adjusting circuit, not shown, and the light adjusting circuit integrates the inputted current and, when the integrated amount reaches a predetermined amount, outputs an emission stop signal to stop the emission of the electronic flash apparatus.

Since the lower end portion of the package 22 is cut into a mountain-like configuration, its lowermost surface 22b is generally parallel to the upper surface 20a of the AF sensor module 20, and, since in addition the signal transmitting lead frames 23 are not projected from the lower portion of the package 22, the package 22 may be placed immediately above the the AF sensor module 20 as shown in the figures. Extent of the protrusion of the package 22 in the vertical direction is thereby held to the minimum, and the size of the camera body 9 may accordingly be reduced in its vertical direction.

Further, according to the present invention, there is also an advantage as follows.

Since, as shown in FIG. 15, the window 37b of the substrate 37 is not allowed to exceed a limit in size because of the requirement in strength, the photometric element 21 cannot be retained within the window 37b if lead frames 23 are to be protruded from the left and right end portions thereof (both ends in the transverse direction of the camera). In the present embodiment, however, because of the fact that the signal transmitting lead frames 23 protrude respectively from the upper and left end portions (only one of the ends in the transverse direction of the camera), it is possible to retain the whole of the photometric element 21 within the window 37b without reducing the number of lead frames 23.

Figure 16:
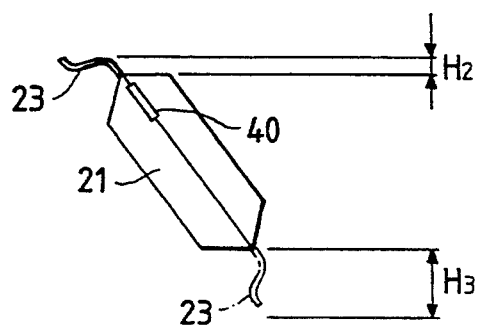

Furthermore, as shown in FIG. 16, since the package 22 is disposed with an inclination and also since the distal ends of the lead frames 23 are bent, the extent H3 in the vertical direction is larger when the lead frames 23 are extended from the lower portion of the package 22 as shown by the double-dashed line. When the lead frames 23 are extended from the upper portion of the package 22 as is the case in the present embodiment, the vertical extent may be reduced such as to H2.

Still further, since a pair of fixing lead frames 40, 41 are extended from the both ends transverse to the camera of the package 22 at positions displaced from the center thereof, the fixing lead frames 40, 41 may be accurately positioned and fixed without abutting the edge of the window 37b.

Still further, since the light receiving portions 21a~21e are respectively secured to positions displaced downward from the center of the package 22, the extent of the upward protrusion of the photometric lens 36 may be reduced and there is no partial incidence of regularly reflected light from the film surface FI upon the light receiving portions 21a~21e. An accurate light adjusting result may thus be obtainable.

Figure 17:
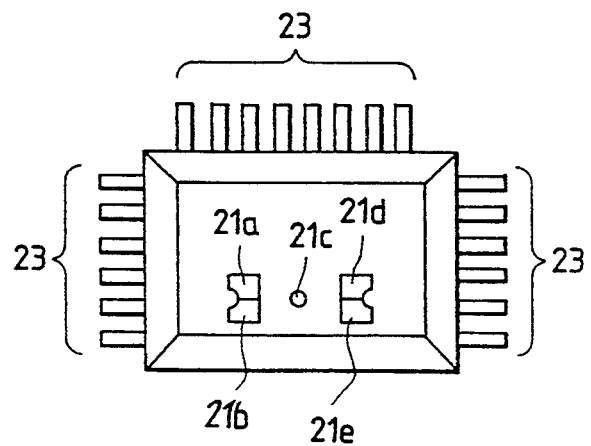
Figure 18:
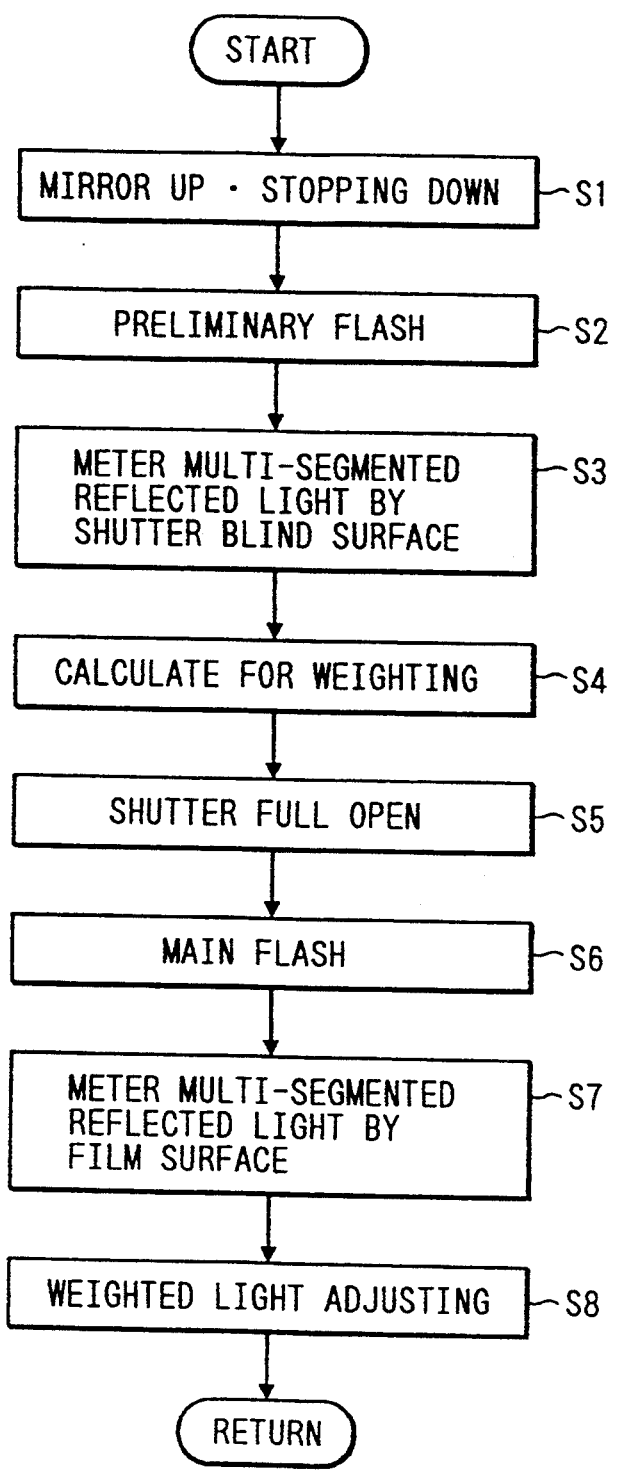

Note that the positions from which the lead frames 23 are extended are not limited to those of the embodiment and as shown in FIG. 17 for example they may be extended from all the end portions but the lower end of the package 22.

Moreover, though a case with an AF sensor module has been shown, if the AF sensor module 20 is not provided, the package 22 may be placed so that its lower end surface is generally parallel to the bottom surface of the camera body 9. Further, while there is a camera known to perform a pre-emission before the flash photographing to check the reflection rate of the object, the luminous flux reflected at the shutter blind surface instead of the film surface FI is measured if such a pre-emission is to be effected.

In addition, while an example has been shown in which the film surface is segmented into five segments, the number of segments is not limited to this. Or the present invention may be applied even to those performing a usual light adjusting without such a segmentation, i.e., to those with a single light receiving portion. Further, the application of the present invention is not limited to the light adjusting of an electronic flash apparatus and it may also be applied in a similar manner to an ordinary photometric element used in an exposure control. In such a case, the photometry is also carried out on the basis of the light reflected at the shutter blind surface.

According to the present invention, the lower end surface of the photometric element body is placed generally parallel to the bottom surface of the camera body or to the upper surface of the AF sensor module and the signal transmitting lead frames are extended from portions other than the lower portion of said body. The disposing space of the photometric element may thus be reduced within the camera body, and an increase in the size of the camera is restricted to the minimum even when the number of the light receiving portions is increased in employing a segmented light adjusting system as described above.

Furthermore, even when the AF sensor module is disposed at the bottom of the camera body, the coexistence of the AF sensor module and the photometric elements as described above is possible while restricting to minimum an increase in the size of the camera.

FIG. 21~FIG. 26 show a third embodiment of the present invention.

First, a configuration of the light receiving optical system is described with reference to FIG. 21 and 22.

FIG. 21 is a view showing the structure of the photometric element 7 and the photometric lens 8. The photometric element 7 includes on the same plane a segmented photometric element 7c which corresponds to a circular photometric region and segmented photometric elements 7e, 7d, 7b, 7a at both sides thereof each of which corresponds to a photometric region in the shape of a rectangle cut by an arc. The photometric lens 8 is an optical member having at positions thereabove three lens portions 8a, 8b, 8c corresponding to the three blocks in the photometric regions.

Figure 4:
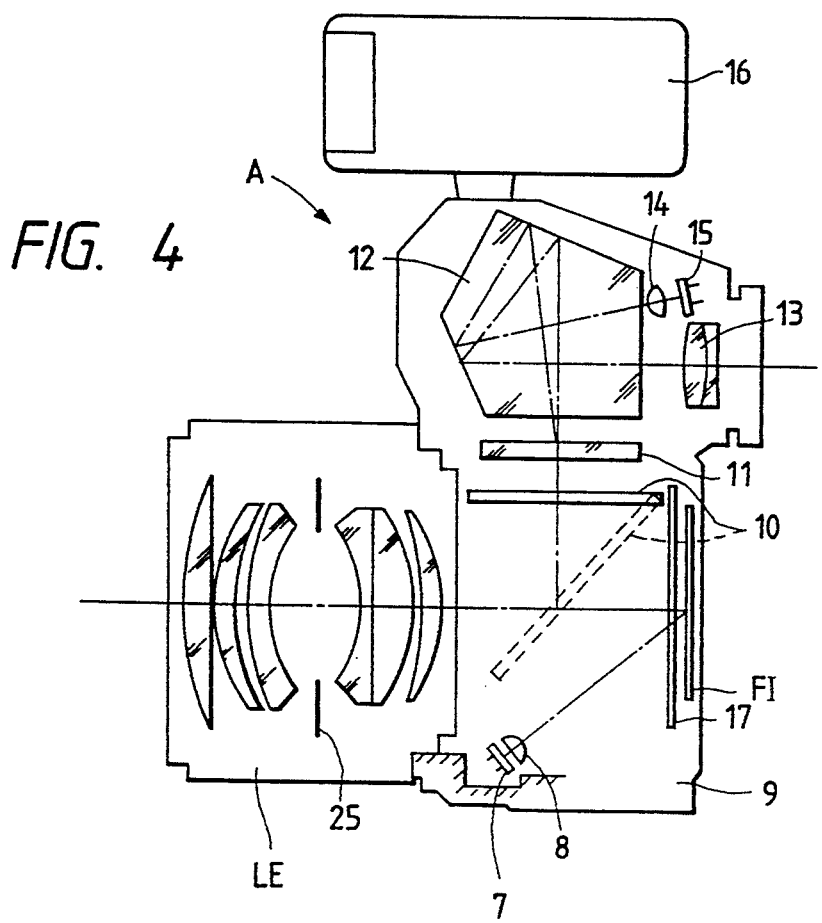
FIG. 4 is a cross section of a TTL auto light adjusting camera.

FIG. 22 is a view showing the optical relationship among the opened region 6 of the film surface, the photometric element 7 and the photometric lens 8 as seen from the direction of A in FIG. 4. The opened region 6 of the film surface is segmented into five regions, a central circular portion 6c and four regions 6b, 6c, 6d, 6e segmenting the periphery thereof. The three, center, left and right, blocks consisting of the five photometric regions of the photometric element as shown in FIG. 21 supervise respectively the center, left half and right half of the film surface opened portion via the three lens portions of the photometric lens as shown by the broken line, the dashed line and the double-dashed line, respectively, and images are almost formed thereon. Furthermore, since the five segmented photometric elements 7a~7e of the photometric element 7 as shown in FIG. 21 are caused to correspond in shape to the regions 6a~6e of the film surface opened regions as shown in FIG. 22, the luminosity values of the five regions are separately metered.

Figure 23:
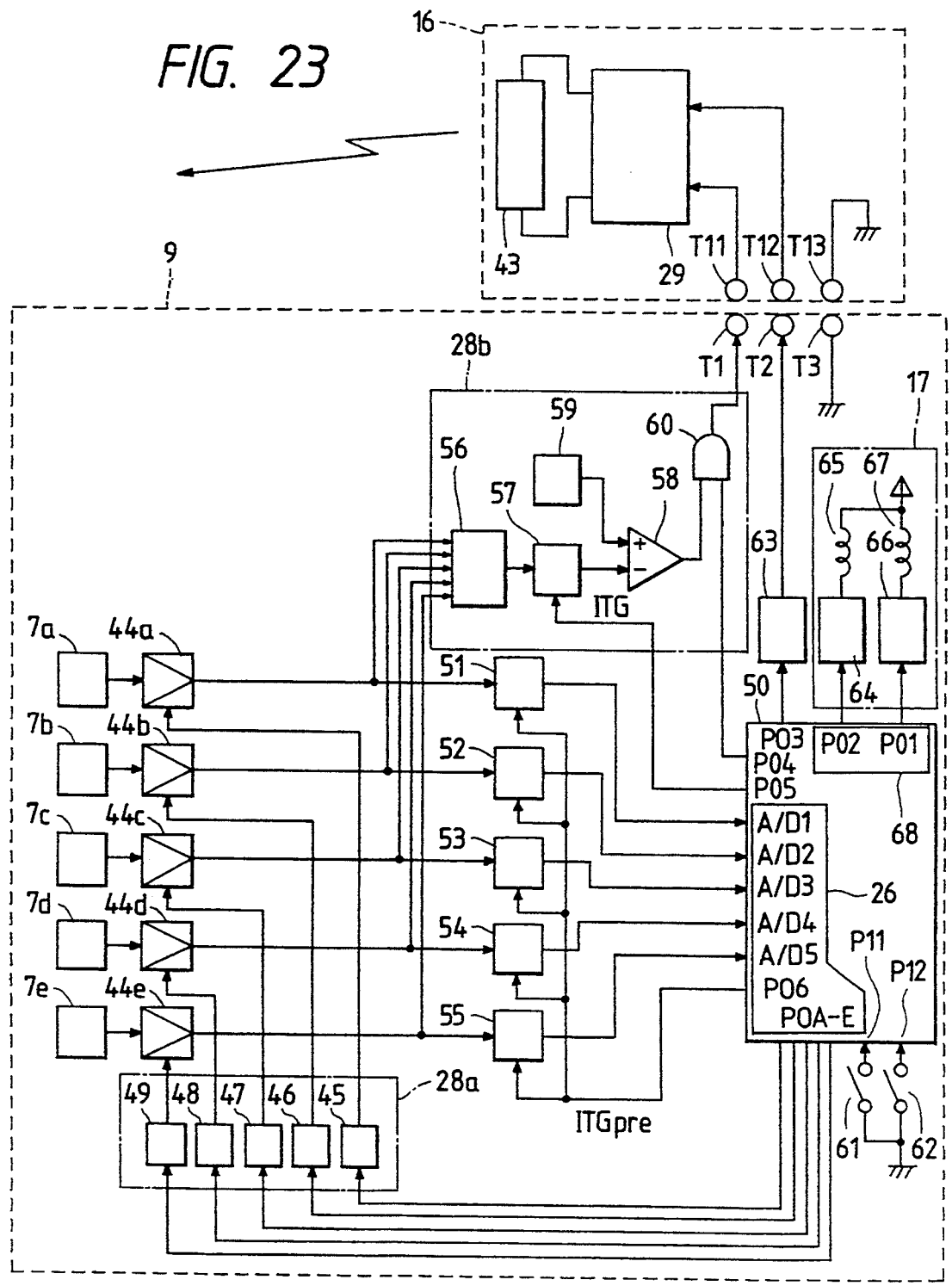

FIG. 23 is a view showing the circuit configuration of the present invention.

This figure comprises the camera body 9 and the flash apparatus 16, and they are electrically coupled to each other by means of contacts T1, T2, T3 and T11, T12, T13.

The flash apparatus 16 controls the starting and stopping of the flash of the emitting portion upon the reception by the emission control circuit 29 of an emission start signal from the contact T12 and an emission stop signal from the contact T11. Contact T13 is a contact to transmit the GND electric potential.

The configuration of the camera body 9 is as follows.

Figure 19:
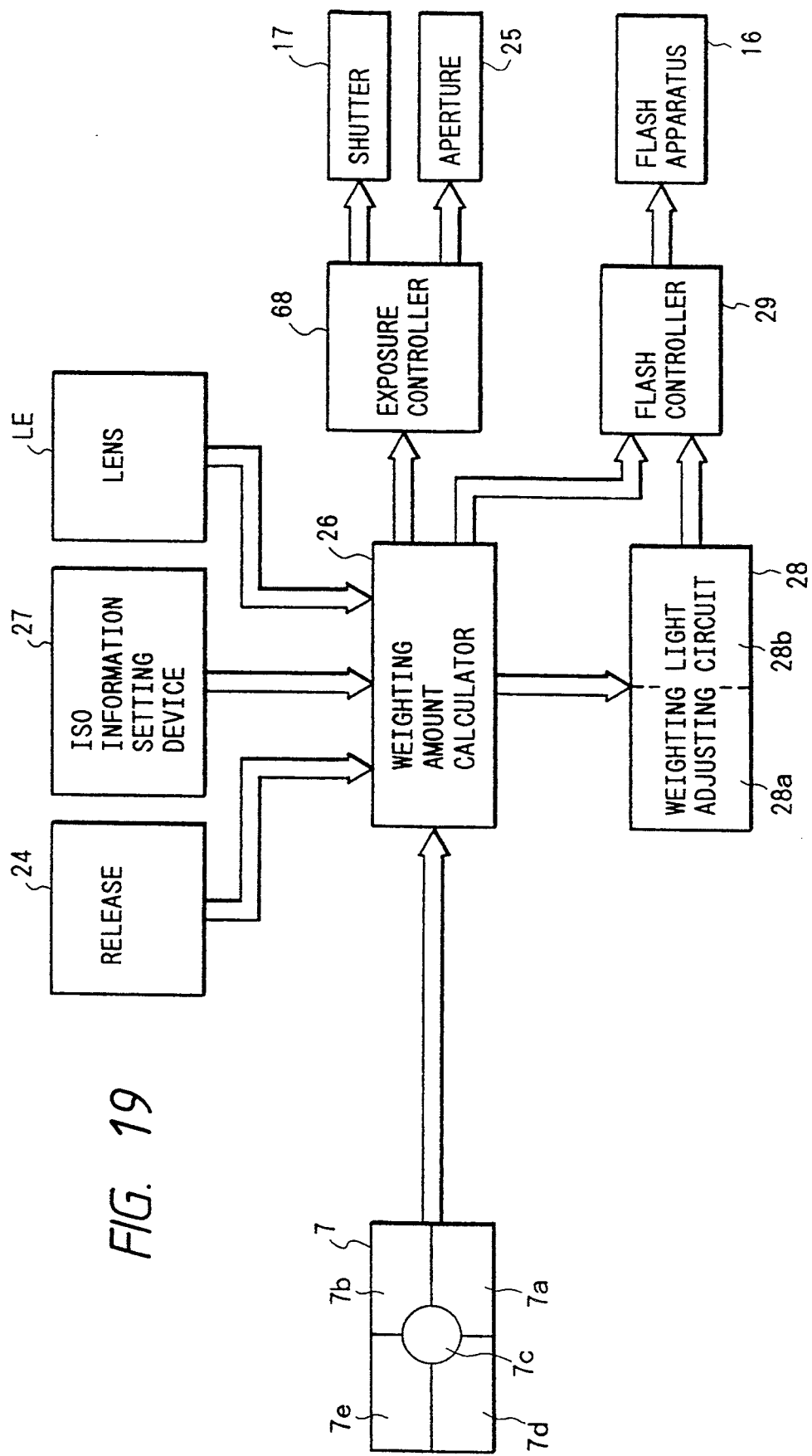

The photometric elements 7a~7e are segmented into five regions as shown in FIG. 21, and each of which provides an electrical signal in accordance with the luminous intensity. Amplifiers 44a~44e are means for respectively amplifying the output of the photometric elements 7a~7e, and the respective amplification factor may be independently and variably set in accordance with output of gain setting signal output means 45~49. These gain setting means correspond to a block 28a of a weighted light adjusting circuit 28 in FIG. 19. The gain setting signal output means 45~49 includes a D/A converter which converts a digital signal from a microcomputer 50 into an analog electrical signal. The outputs of the amplifiers 44a~44e are branched into two systems, and one of the systems enters into integration means 51~55 respectively for each output. The integration means 51~55 integrates the outputs of the amplifiers 44a~44e respectively or resets the integrated amount on the basis time interval in accordance with a single integration control signal ITGpre provided by the microcomputer. The outputs of the integration means 51~55 are inputted into conversion input terminals A/D 1~5 of the microcomputer 50. Another branch of the outputs of the amplifiers 44a~44e enters into adding means 56 and the five output are added thereat. Its output is integrated on the basis of time intervals or a resetting of the integrated amount is carried out at the integration means 57 in accordance with an integration control signal ITG provided by the microcomputer 50. The output of the integration means 57 is compared with the output of a criterion level generation means 59 at a comparator means 58, and the result is entered into one of the input terminals of an AND gate 60. One of the output ports of the microcomputer 50 enters into the other input terminal of the AND gate 60, and the output terminal of the AND gate 60 is connected to the contact T1. Block 28b of the weighted light adjusting circuit 28 as shown in FIG. 19 comprises the adding means 56, the integration means 57, the criterion level generation means 59, the comparator means 58 and the AND gate 60.

A switch 61 is turned on from off when the mirror up operation is completed in the sequence of the camera and is returned to its off state upon the start of the mirror down operation, and its output is entered into one of the input ports of the microcomputer 50. A switch 62 is turned on from off when the shutter is fully opened upon the completion of opening of the leading curtain of the shutter and is returned to its off state with the shutter charge operation after the complete closing of the trailing curtain of the shutter, and its output enters one of the output ports of the microcomputer 50. Numeral 63 denotes an interface for outputting a signal which upon the receipt of the output from the microcomputer 50 informs the flash apparatus 16 via the contact T2 of the timing of starting the emission. Numeral 64 is an interface for controlling the electric conduction of a magnet 65 which retains the leading curtain upon the receipt of an output from the microcomputer 50, and numeral 66 is an interface for controlling the electric conduction of a magnet 67 which retains the trailing curtain in a similar manner.

The operation of the block as shown in FIG. 23 of the present embodiment will be described in accordance with the flowchart in FIG. 24 and with reference to the timing chart in FIG. 25.

Figure 24:
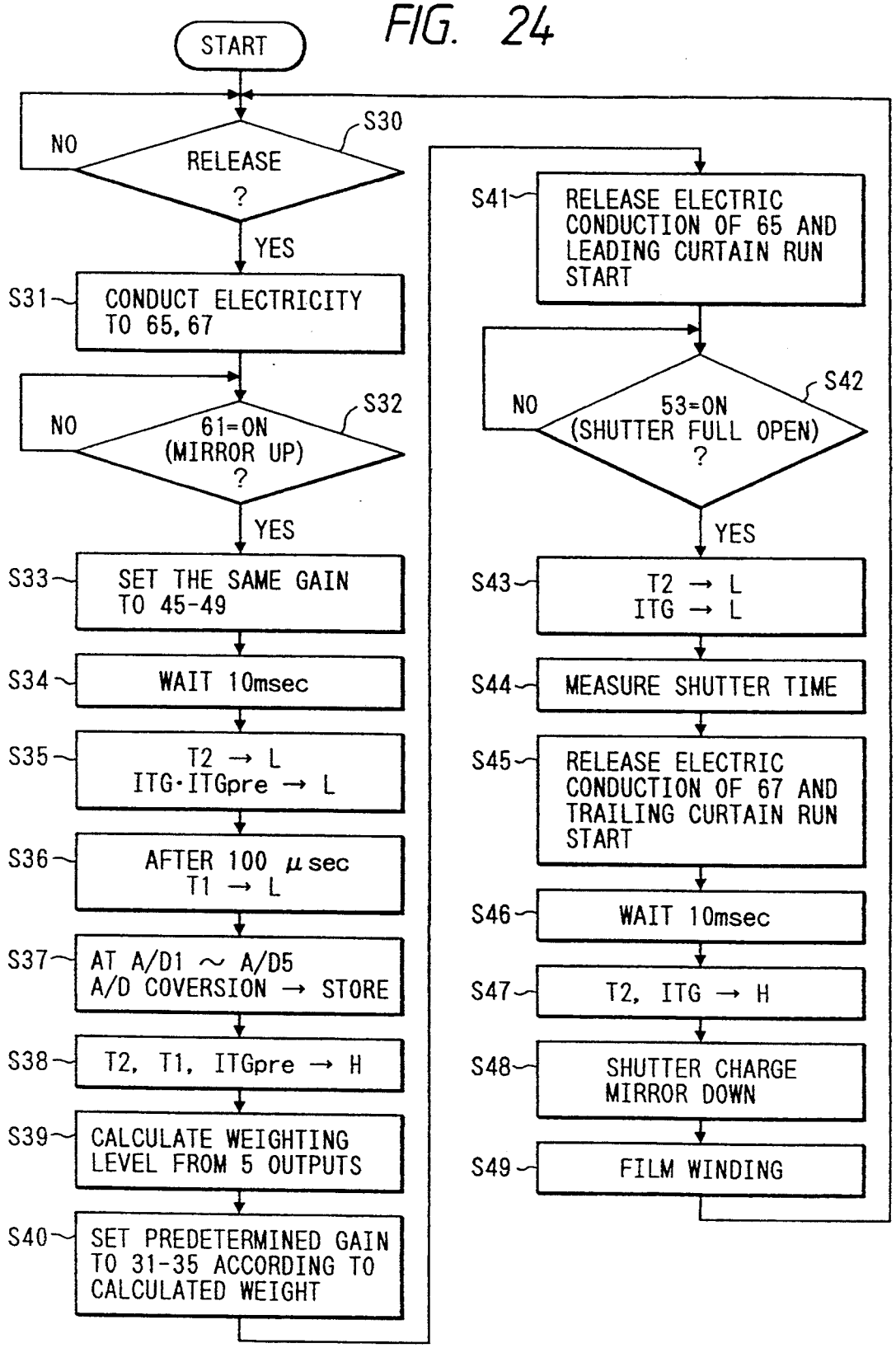

Referring to FIG. 24, at step S30, the program waits for an operation of a release start-up means, not shown. When it is operated and the release operation is started, the shutter magnets 65, 67 are supplied by electricity at step S31 and the leading curtain and the trailing curtain are retained by means of the electricity, and at the same time the mirror up operation is started by starting a mirror driving means (point "a" in FIG. 25), not shown. The program waits at step S33 for turning on of a mirror up operation completion detecting switch 61, and, when it is turned on (point "b" in FIG. 25), the program proceeds to step S33 where a signal is outputted so that signals at an identical level are provided by gain setting signal output means 45~49, i.e., so that the amplification factors of the five amplifiers 44a~44e are set identically.

This is a preparation so that outputs may be read by using a same scale when the reflection rate distribution of the segmented object field due to a flash emission is detected on the basis of a preliminary flash which is to be carried out immediately thereafter. Further, the set gain in this case is preferably set at a high level so as to earn more than a certain degree of integrated output even if the preliminary emission quantity is small. After waiting for 10 msec at step S34 which is necessary to quiet the mirror bound, the contact T2 is lowered to its low level so as to cause the flash apparatus 16 emit a preliminary flash at step S35 while both of the integration signals ITGpre and ITG are lowered to their low level (point "c" in FIG. 25). When the flash apparatus 16 receives the emission start signal from the contact 12, the emitting portion 43 is started to emit by the action of the flash control means 29. Then as shown in the timing chart in FIG. 25, with the rising of the flash wave form, outputs respectively integrating electrical signals corresponding to the reflected lights from the shutter leading curtain surface, which correspond to the segmented regions at the opened film surface portion, rise from "c" to "d" as indicated by the curves of 51~55 integrated outputs.

At the same time, the outputs of the amplifiers 44a~44e are added by means of the adder 56 so that the output voltage integrated at the integration means 57 also rises from point "c" to point "d". Although a low level signal is supplied to the AND gate 60 when the criterion level is exceeded by at the comparator means 58, the microcomputer 50 at step S36 outputs a signal to the AND gate 60 at 100 μsec after the outputting of the emission start signal (point "d" in FIG. 25) even when the criterion level is not reached so as to bring the contact T1 to its low level. This is a signal to instruct the flash apparatus 16 to stop the emission and means to restrict the maximum limit of the emitted amount in preparing for the main flash even when the received light amount is found to be insufficient as a result of the light adjusting, though the light adjusting is effected also at the time of preliminary flash. Thus the flash apparatus 16 is caused to instantly stop the emission of the emitting portion 43 by the action of the flash control means 29, and, after the point "d" in FIG. 25, each integrated output is in fact fixed.

At this interval, the microcomputer 50 at step S37 serially carries out A/D conversion with respect to five input levels at the A/D conversion input terminals and stores the results. In other words, at this point, the segmented reflection rate distribution on the basis of the preliminary flash by the flash apparatus 16 is detected.

Figure 25:
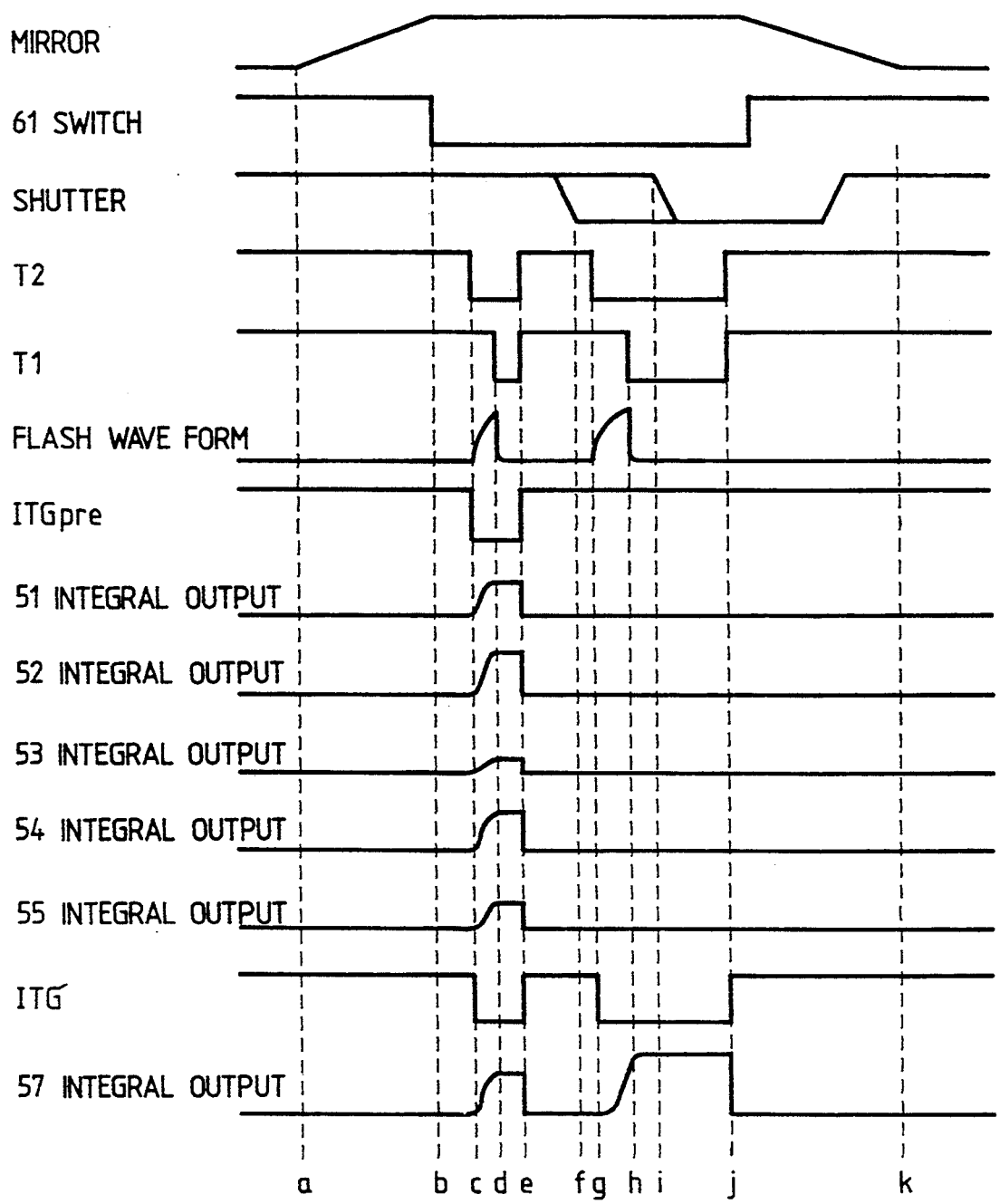

When all A/D conversions are completed, all of the contacts T2,T1 and the integration control signal ITGpre are returned to their high level (point "e" in FIG. 25). When ITGpre is returned to its high level, the integrated amount at the integration means 51~55 are reset.

Figure 20:
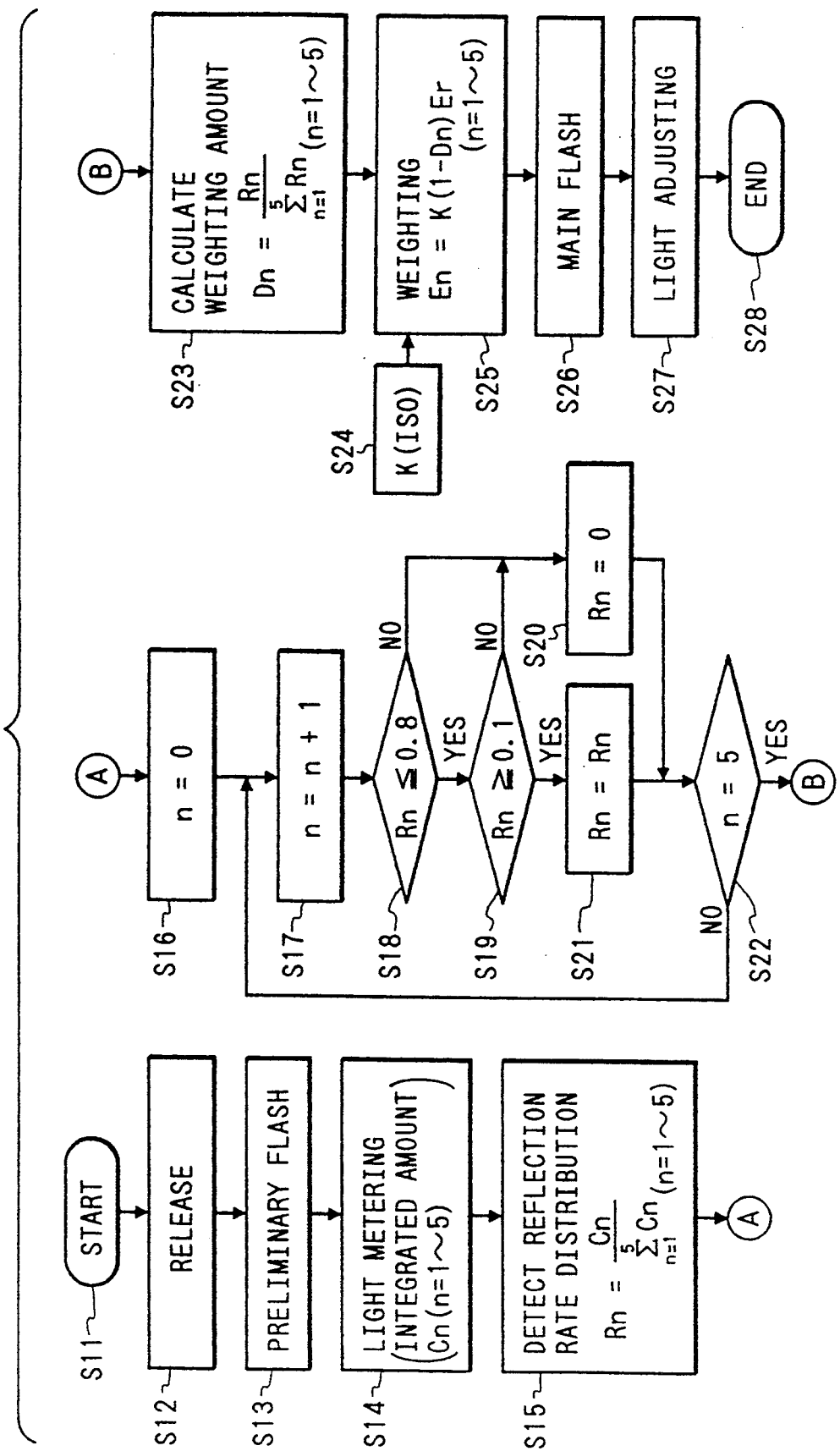

Then, at step S39, a predetermined calculation is performed in the microcomputer 50 in accordance with the flowchart as shown in FIG. 20 by means of weighting calculation means 26, as described above, shown in FIG. 19 on the basis of the five integrated outputs so as to determine the weights to be applied at the subsequent main flash to the outputs of the five photometric elements 7a~7e. At step S40, signals are supplied to the gain setting signal output means 45~49 to apply gains corresponding to thus determined weights respectively to the amplifiers 44a~44e. After its completion, at step S41, the electric conduction of the leading curtain magnet 65 is terminated so as to start running of the leading curtain and the system waits at step S42 for the turning on of the switch 62. When this is turned on, i.e., the shutter is fully opened (point "f" in FIG. 25), the system proceeds to step S43 where a signal is outputted to the interface 63 so as to bring the contact T2 to the flash apparatus 16 to its low level, whereby, while causing to start the emission of the flash apparatus 16, the integration control signal ITG at its low level is outputted to the integration means 57 (point "g" in FIG. 25).

The light adjusting control from this point on leaves the microcomputer program and is carried out by the hardware as shown in FIG. 23. When receiving the emission start signal from the contact T12, the flash apparatus 16 is caused to start an emission of the emitting portion 43 by the action of the flash control means 29 in the similar manner as the previous preliminary flash of the flash apparatus 16. As shown in the timing chart in FIG. 25, with the rising of the emission wave form, an integrated output voltage, which has been integrated by the integration means 57 through the addition at the adder 56 of the outputs, provided by the amplifiers 44a~44e to which gains have been respectively applied in accordance with the previously obtained weights, based on the electrical signals corresponding to the reflected lights from the film surface which correspond to the segmented regions on the opened portion of the film surface, rises from point "g" to point "h". Comparator means 58 provides a low level output when the criterion level 59 is exceeded by the output of the integration means 57 (point "h" in FIG. 25). This output is transmitted from the contact T1 to the flash apparatus 16 via the AND gate 60 as a signal for stopping the emission. The flash apparatus 16 instantly stops the emission of the emitting portion 43 by the action of the flash control means 29 so as to complete the light adjusting.

Afterwards, it is returned to the control by the microcomputer 50 that the shutter time is measured at step S44, and the electric conduction of the trailing curtain magnet is removed at step S45 so that running of the trailing curtain is started (point "i" in FIG. 25). A 10 msec delay is provided at step S46 to wait for the completion of the trailing curtain run, and the contact T2 and the integration control signal ITG are returned to their high level at step S47 (point "j" in FIG. 25).

At steps S48 and S49, in preparing for the next shutter release, a shutter charge, mirror down (point "k" in FIG. 25) and film winding are effected by means which are not shown, and the program then returns to step S30.

Through the description as above, steps S35 to S40 in the flowchart must be performed between the completion of the mirror up and the point at which the leading curtain is started to open, and such a time interval accordingly causes an increase in the time lag for the shutter release. However, the time required for this may be estimated as 100 μsec at the maximum for the preliminary flash, 3 msec at most for the A/D conversion of the five integrated outputs and about 2 msec (depending on the processing speed of the microcomputer) for the calculation of the weights for the main flash from thus obtained result. Thus there is only an about 5 msec increase in time comparing to a prior system and a substantial delay is not caused.

Figure 26:
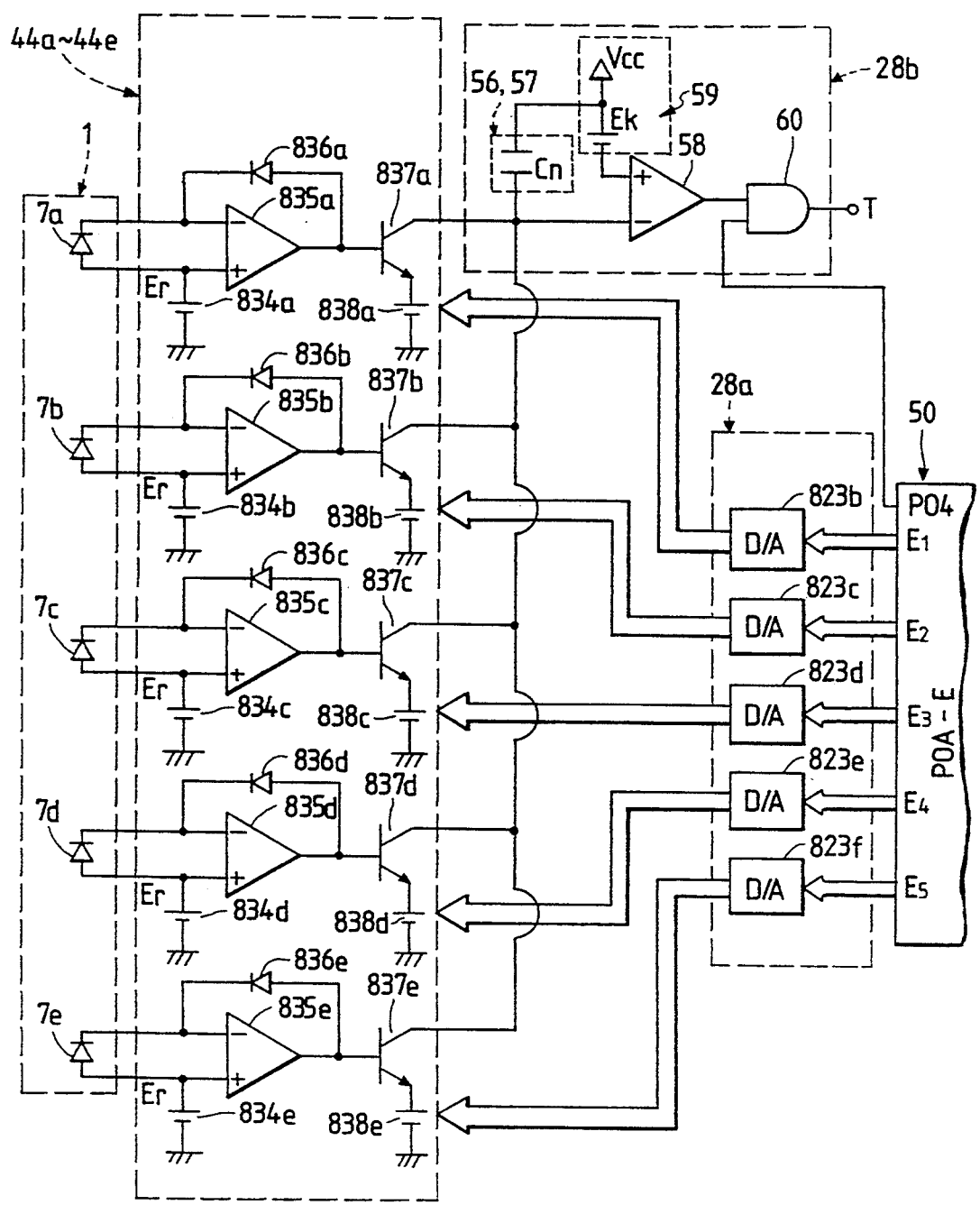

A circuit diagram for the weighted light adjusting circuit 28 will now be described further in detail with reference to FIG. 26.

The photometric elements 7a~7e are constituted by five photodiodes, and, when these photometric elements are stricken by light, electric potentials corresponding to the quantities thereat are outputted from OP-amps 835a~835e and are applied to the bases of the transistors 837a~837e. While collector currents then flow in from the Vcc via condenser Cn, the amounts thereof vary according to the electric potentials at the variable power sources 838a~838e. The amplifiers 44a~44e as shown in FIG. 23 are constituted by the OP-amps 835a~835e, the transistors 837a~837e and the variable power sources 838a~838e.

Electric potentials at these variable power sources 838a~838e are set as the result that voltages En outputted from the output portion POA-E of the CPU 50 of the weight calculation means 26 as described above are set via the A/D converters 823b~823f.

For example, when supposing that the portion corresponding to a segmental photometric element 7a of the photometric element 7 has received little reflected light of a preliminary flash and thus a reflection rate distribution of R1=0.05 has been detected, the assigned weight becomes D1=0 and a large value is set as the voltage E1 from the aforementioned formula (3), $E_n = K(1-D_n)E_r$. Then, the collector current flowing into the transistor 837a becomes smaller and thus is not likely to contribute to the cumulation of the electric charge at the condenser Cn. A comparator 842 is designed to provide an emission stop signal to the flash control apparatus 29 when the criterion potential Ek at a nonreversible input terminal side is exceeded by the potential at a reversible input terminal side. The fact of making little contribution to the charge cumulation at the condenser Cn (corresponding to 56,57 as shown in FIG. 23) thus means that a low weight has been assigned to the output of the photodiode 7a and that an effect from the portion which adversely affects the TTL light adjusting has been removed.

As shown in the figure, a circuit identical to one comprising 834a~838a is attached to each of the photodiodes 7b~7e, and the circuits are respectively integrated with the collectors of the transistors 837a~837e and are connected to the condenser Cn. Thus the output of a photodiode in a photometric region to which a high weight is assigned is more likely to contribute to the charge cumulation at the condenser Cn and predominantly determines the output timing of the emission stop signal.

Figure 27:
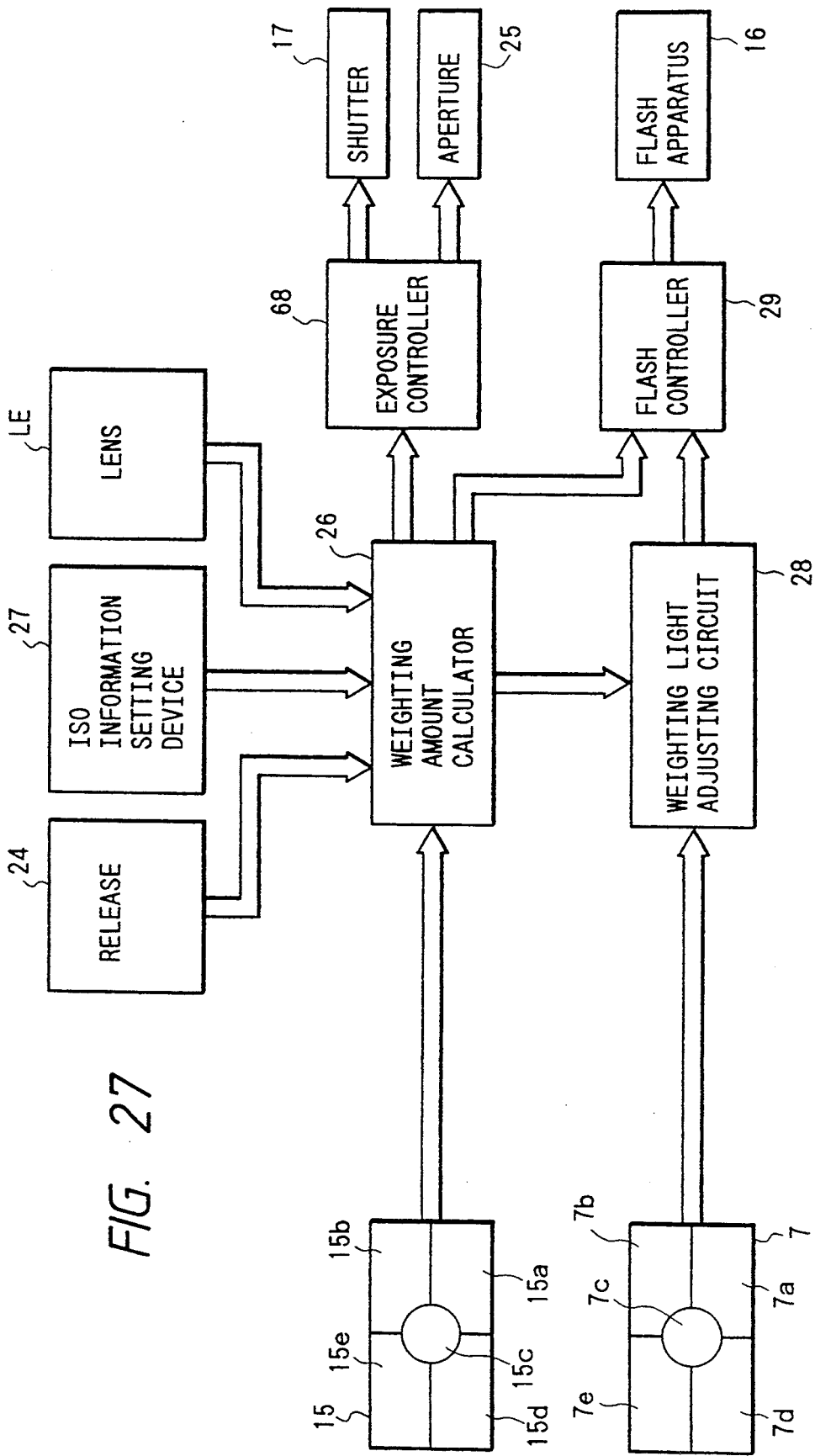
FIG. 27 is a block diagram of an auto light adjusting control apparatus according to the fourth embodiment of the present invention.
Figure 28:
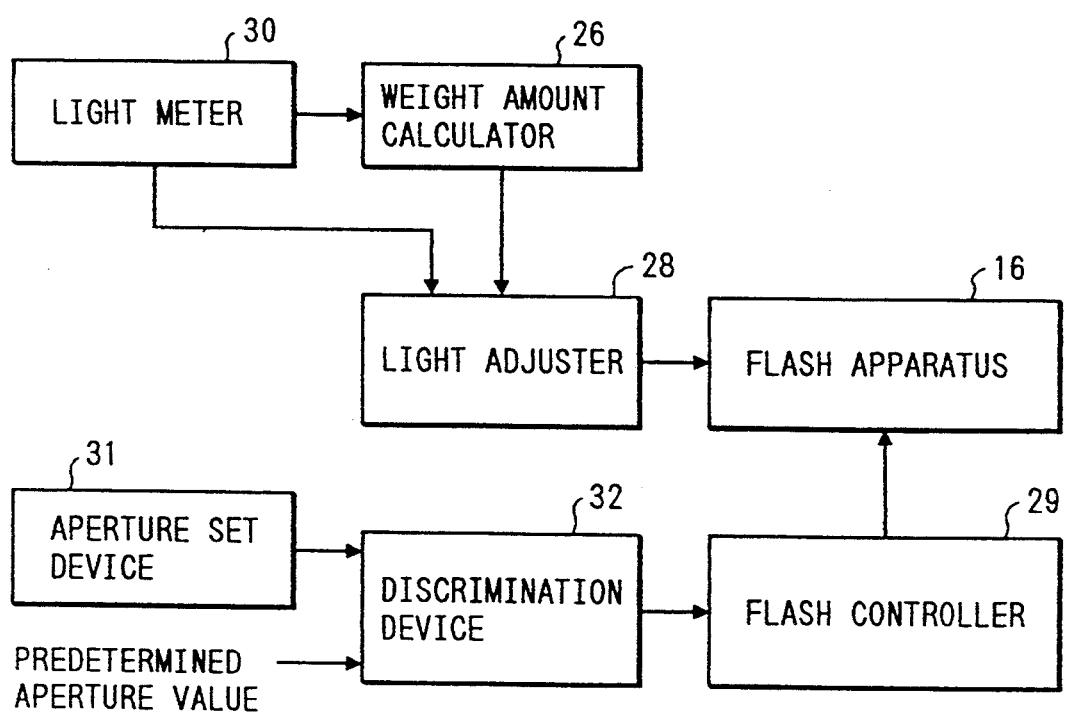
FIG. 28 is an explanatory block diagram.

FIG. 27 is a block diagram of a fourth embodiment according to the present invention. Referring to FIG. 27, those components which are identical in function to those shown in FIG. 19 are denoted by the same numerals and detailed descriptions therefor are omitted.

The characteristic of the fourth embodiment as shown in FIG. 27 and FIG. 4 is such that photometric element 15 for the reflected light of a preliminary flash and photometric element 7 for the reflected light of the main flash are separately provided.

When the main mirror 10 is down to the position as indicated by the broken line in FIG. 4, the light passing through the photographing lens group LE is reflected at the main mirror 10 and is further reflected at the pentagonal prism 12, and a portion of which reaches the photometric element 15 through the photometric lens 14. The photometric element 15 is segmented as shown in FIG. 27 and is designed to meter the reaching light, and its output is transmitted to the weighting factor calculation means 26 to be subjected to the calculation.

In the operation, when the release button is released at a condition as shown in FIG. 4, a preliminary flash by the flash apparatus 16 is performed, and the light reflected by the object passes through the photographing lens group LE, is reflected by the main mirror 10 which is at the position indicated by the broken line and is received by the photometric element 15 via the photometric lens 14.

The photometric element 15 comprises segmented photometric elements 15a~15e which are obtained by segmenting into five regions in the same manner as the photometric element 7. This photometric element 15 carries out photometry by segmenting the object field into five regions, and thus obtained photometric currents are inputted into the weighting amount calculation means 26 so that the detection of the reflected light from the object field may be carried out through steps S14~S23 as shown in FIG. 20.

Weighting factors are then determined by the weighting factor calculation means 26 on the basis of the output from the photometric element 15 and are entered into the weighting light adjustment circuit 28. Next, the main mirror 10 is up and at the same time the aperture 25 of the lens is reduced to achieve the photographing aperture value, whereby a main flash of the flash apparatus 16 is performed. At this time, the reflected light of the main flash returned from the object is reflected at the film surface FI so as to be measured in segments by the photometric element 7, and thus obtained photometric outputs are subjected to weighting at the light adjusting circuit 28 and are then integrated. And, when this integrated value reaches a predetermined value, the emission of the flash apparatus 16 is stopped by the flash control means 29.

Note that the weighting calculation on the basis of a preliminary flash caused by the flash apparatus 16 is only required to determine the relative weighting factors for the segmented regions, whereby the preliminary flash may be shorter in time than a main flash, making unnecessary a large capacity electric power source.

As described above, according to the present invention, an effective photometric system, in which the object field is segmented to obtain a luminance information from which a most suitable exposure for the main object is obtained through a predetermined algorithm, may also be applied to a flash photographing, and a photograph with an appropriate exposure can be taken even at a scene where a large discrepancy in exposure occurs when using a conventional TTL auto light adjusting control system.

Further, since using a preliminary flash means emitting twice, there have been complaints when the subject is a person such as that the preliminary flash is dazzling or that a photograph with closed eyes is resulted. However, since, in the present invention, a preliminary flash, detection of reflection rate and calculation of weighting factors are carried out at a high speed immediately before the opening of the shutter, only a few msec is required as the time interval between the preliminary flash and the main flash, it is not sensed that there have been two emissions and a better impression is provided even when the subject is a person.

Furthermore, since the delay in opening of the shutter after the mirror up is only a few msec when using a single-lens reflex camera, there is also an advantage that little changes occur in the so-called time lag or in the release feeling.

Still further, according to the present invention, a configuration as shown by the embodiment becomes possible in which the leading curtain surface of a focal plane shutter is not used as the reflecting member at the time of preliminary flash, and thus the present invention may also be applied to cases where another curtain is prepared to have various configurations and various reflection rate distribution.

Still further, according to the present invention, on the basis of the reflected light obtained from a preliminary flash, the regions which adversely affects the light adjusting control, such as a region at which the reflection rate becomes very high for example because of a gold-leafed folding screen existing in the object field or a region at which the reflection rate becomes very low because its object field is a background, are ignored and removed from the subject of weighting decision. Thus the light adjusting at the time of main flash may be accurately carried out.

A description will now be given by way of FIGS. 29~33 with respect to a fifth embodiment in which the present invention is applied to a single-lens reflex camera as shown in FIG. 4.

Figure 29:
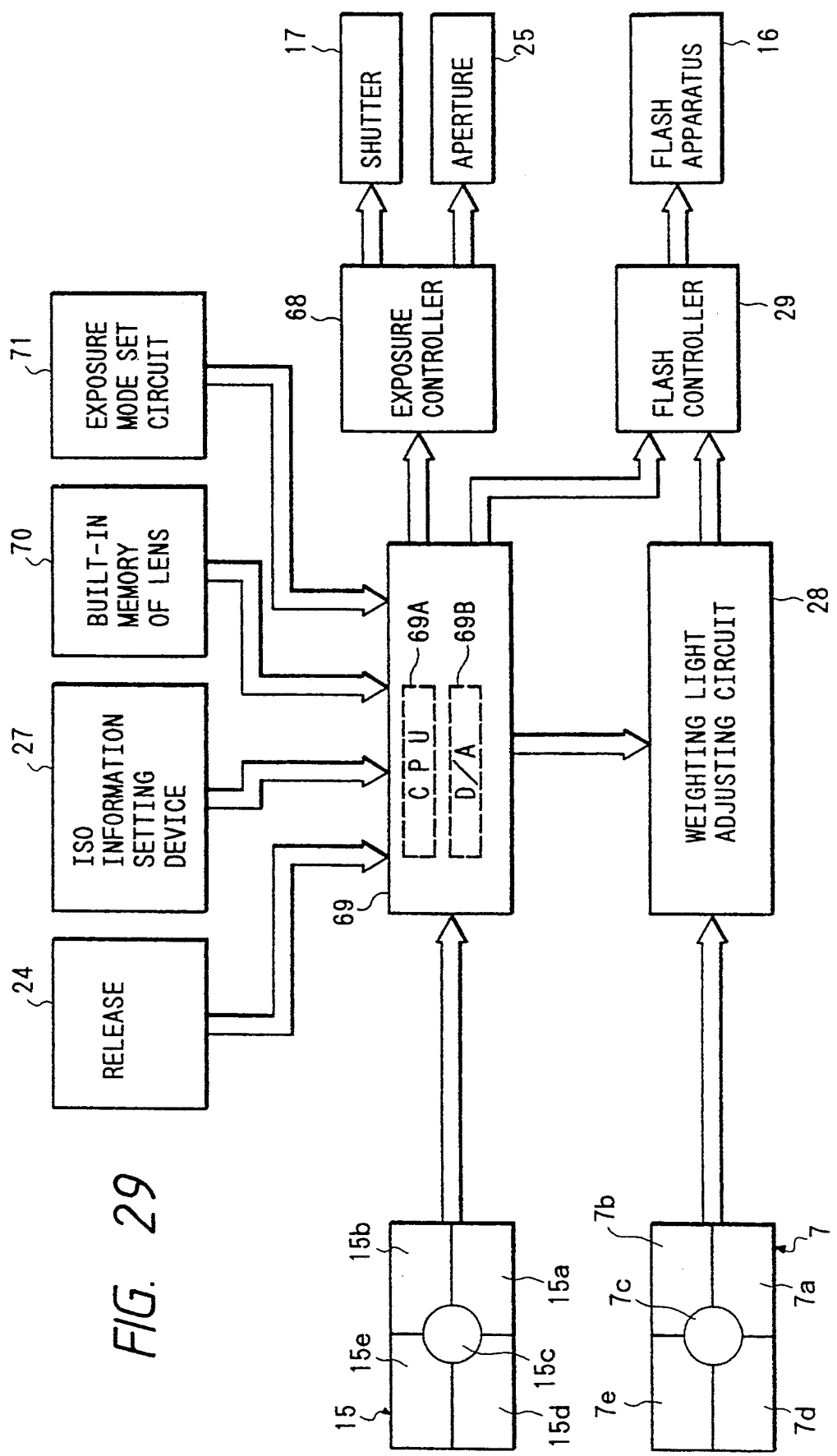

FIG. 29 is block diagram of a camera according to the present invention. An exposure calculating photometric element 15 is segmented into five regions 15a~15e and carries out photometry by segmenting the object field into five regions. The five outputs of this exposure calculating photometric element are entered into a microcomputer 69 having such as a CPU 69A and an A/D converter 69B and are used in a known exposure value calculation. Further, a light adjusting photometric element 7 is also segmented into five regions 7a~7e and carries out photometry by segmenting the object field into five regions at the time of flash photographing. The object field segmented by these five regions corresponds to the object field segmented by the five regions of the exposure calculating photometric element 15. Five outputs of this light adjusting photometric element 7 are entered into the weighting light adjusting circuit 28.

A release signal from the release button 24, an ISO information from an ISO information setting circuit 27, an opened F value signal from a built-in memory 70 of the lens and an exposure mode information from an exposure mode setting circuit 71 are respectively inputted into the microcomputer 69. Set as exposure modes are a program mode (P), an aperture priority mode (A), a shutter speed priority mode (T), and a manual mode (M). The microcomputer 69 calculates the aperture value and the shutter speed by using known methods and controls the shutter 17 and the aperture 25 via an exposure control circuit 68. It furthermore decides whether a flash photographing is appropriate and inputs an emission start signal into the flash control apparatus 29 at a predetermined timing at the time of flash photographing. In addition, the microcomputer 69 as will be described later calculates a weighting value Dn from a reflection rate distribution, and Dn is converted into a voltage En by the following formula (3) to be entered into the weighted light adjusting circuit 28.

$$En = K(1-Dn)Er \qquad (3)$$

where n is 1~5

Er is the standard voltage, and

K is a value corresponding to the ISO information.

Figure 30:
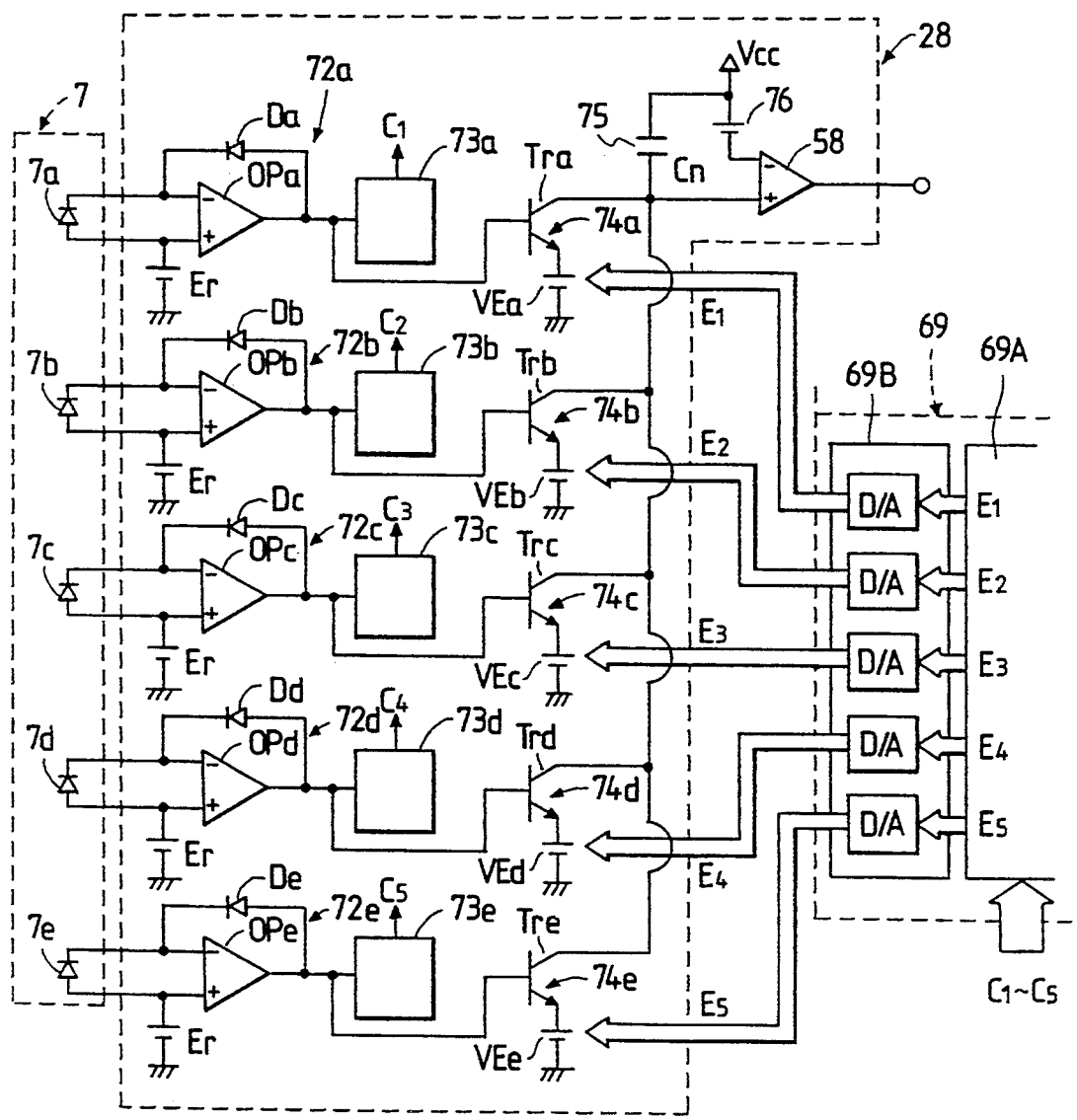

The weighted light adjusting circuit 28 as shown in FIG. 30 comprises: logarithmic compression circuits 72a~72e for respectively outputting the outputs from the regions 7a~7e of the light adjusting photometric element 7 in a logarithmically compressed manner; integration circuits 73a~73e for respectively integrating the outputs from the logarithmic compression circuit 72a~72e; weighting correction circuits 74a~74e for assigning weights for the outputs of the logarithmic compression circuit 72a~72e; a condenser 75 for integrating the electric current flowing from the power supply voltage Vcc in accordance with the five outputs of the logarithmic compression circuit 72a~72e to which correcting weights have been respectively assigned; and a comparator 58 which makes a comparison between the voltage signal integrated at the condenser 75 and the voltage signal from the criterion power source 76 and which provides an emission stop signal when the criterion voltage signal is exceeded by the voltage signal from the condenser 75.

Logarithmic compression circuits 72a~72e respectively comprise op-amps OPa~OPe and feedback diodes Da~De and standard voltage Er.

Weighting correction circuits 74a~74e respectively comprise transistors Tra~Tre, variable power supply source VEa~VEe, and the variable power supply source VEa~VEe are respectively set at voltage En (n=1~5), shown by the above mentioned formula (3), provided by the microcomputer 69. The emission stop signal from the comparator 58 is inputted into the flash control circuit 29 so as to stop an emission of the flash apparatus 16.

Operation of a TTL auto light adjusting camera having a configuration as above will now be described in accordance with the flowcharts in FIG. 31~FIG. 33.

Figure 31:
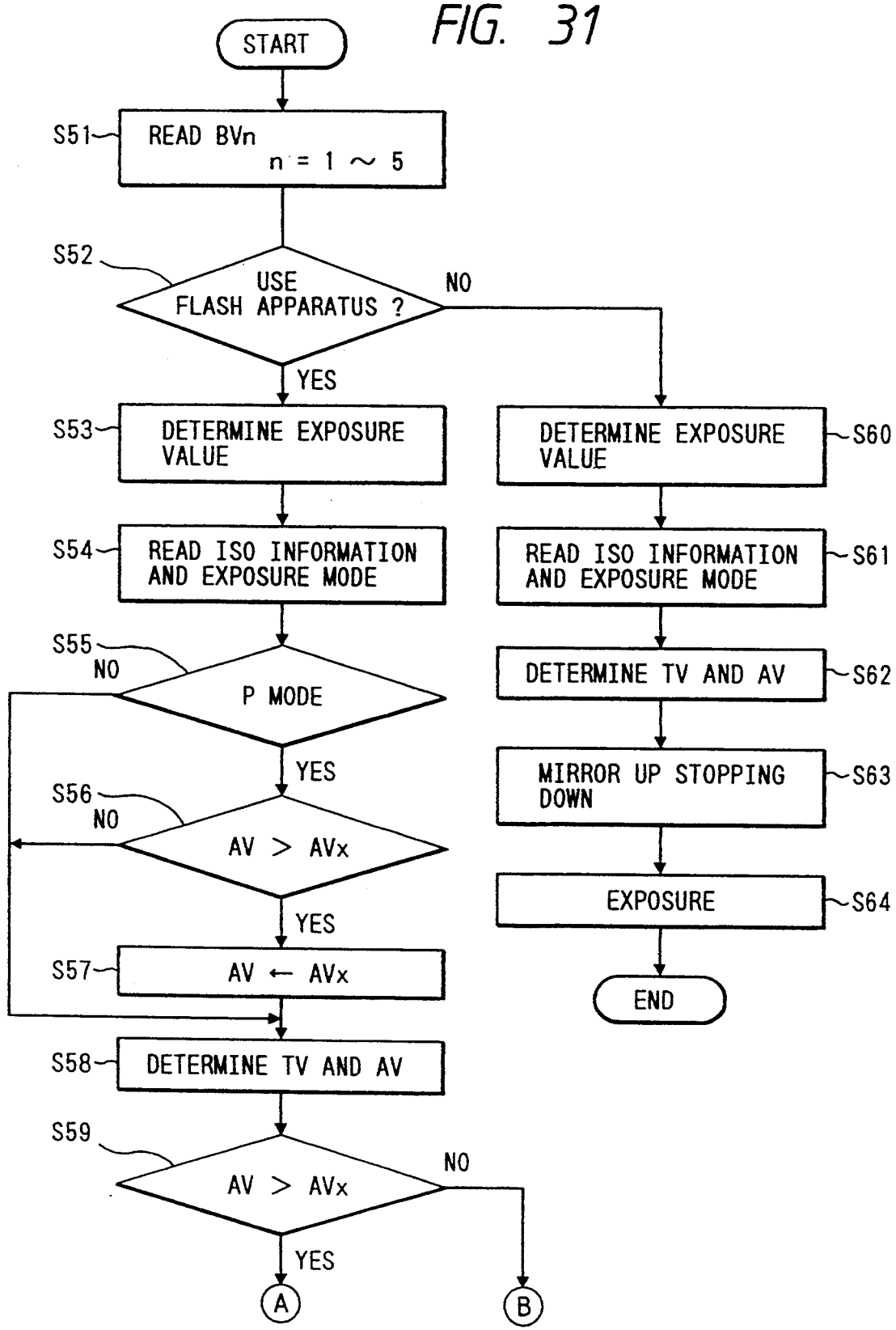

Referring to FIG. 31, the program proceeds to step S51 when the release button 24 is turned on where luminance values BVn (n=1~5) possessed by five outputs from the exposure calculating photometric element 15 are read, and it then proceeds to step S52 at which a decision is made on use/nonuse of the flash apparatus 16. The program proceeds to step S53 when using the flash apparatus 16 while it proceeds to step S60 when not using the same.

At step S53, the exposure value BV is determined by processing the luminance values BVn with a predetermined algorithm (see for example FIG. 5 of Japanese Patent Laid-Open No. 63-83713). ISO information and exposure value are read at step S54 and the program then proceeds to step S55 at which it is seen if a programmed mode is used. When the program mode is used, at steps S56,S57, if the demanded aperture value AV exceeds a predetermined aperture value AVx, the value is limited to AVx, and the program then proceeds to step S58.

At step S58, shutter speed TV and aperture value AV are determined on the basis of the exposure value BV determined at step S53, the ISO information and the exposure mode. At step S59, a comparison is made between the aperture value AV determined at step S58 and the predetermined aperture value AVx. If AV>AVx, the program proceeds to step S71 in FIG. 32 while, if AV≦AVx, the program proceeds step S81 in FIG. 33. An aperture value AVx takes a value such as f=5.6, and, if it is further stopped down from this value, a reflection rate distribution cannot be accurately measured at the time of a preliminary flash because of a lack of quantity of the light reaching the light adjusting photometric element 7 through the lens LE. Accordingly, at the procedure following step S71, no preliminary flash is carried out and a photographing is performed with a main flash after setting predetermined weighting factors which emphasize the central portion.

Figure 32:
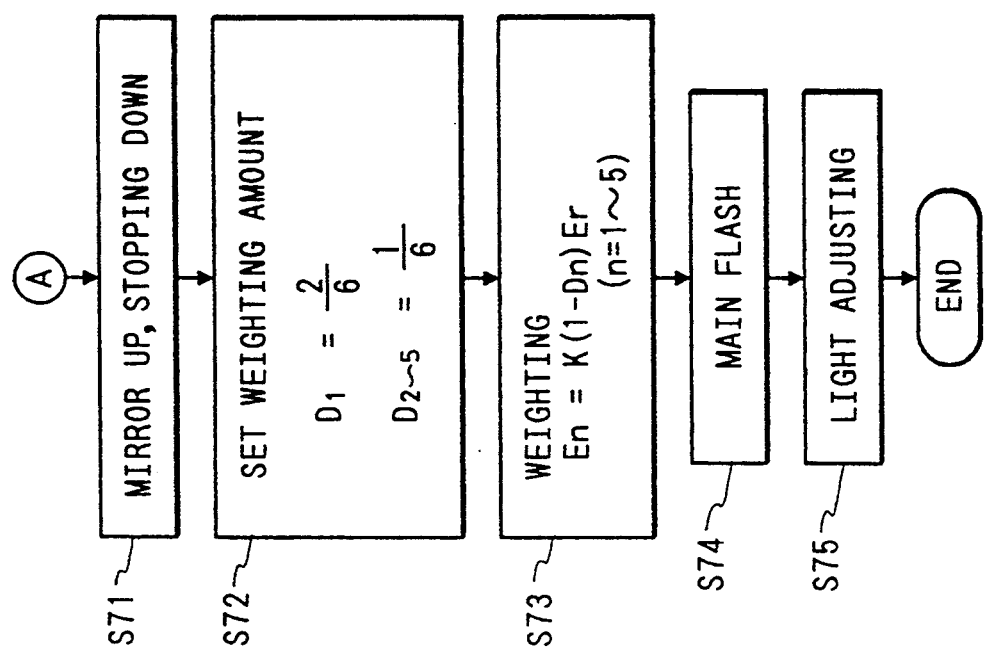

FIG. 32 shows the procedure at step S71 and thereafter. At step S71, a stopping down to the determined aperture value AV and a mirror up are carried out, and, without a preliminary flash, the program proceeds to step S72 at which weighting factors Dn are set. In this embodiment, weighting amounts Dn at the time of using a small aperture value are set with the emphasis on the center region as follows:
the center region D1=2/6
the peripheral regions D2–D5=1/6.
Next, at step S73, voltage values En corresponding to the weighting amounts Dn are obtained from the aforementioned formula (3) and the variable power supply sources VEa~VEe of the weighted light adjusting circuit 28 are set with these values by means of microcomputer 69. At step S74, the microcomputer 69 supplies an emission start signal to the flash control circuit 29 to cause to start a main flash while driving the shutter 17 with a predetermined timing. And, at step S75, a light adjusting is carried out.

Light adjusting in this embodiment is effected as follows.

Outputs from the regions 7a~7e of the light adjusting photometric element 7 are amplified by means of logarithmic compression circuit 72a~72e and then inputted into the bases of the transistors Tra~Tre which comprise the weighting correction circuit 74a~74e. Thereby, transistors Tra~Tre are turned on so that a collector currents is started to flow from the power supply voltage Vcc via the condenser 75. Variable power sources VEa~VEe which are respectively connected to the emitters of the transistors Tra~Tre are respectively set at voltages En so as to emphasize the center region, and the collector current becomes larger with the decrease in the voltage value En. In this case, therefore, the condenser 75 is charged depending more on the photometric output of the center region 7c than on the peripheral regions of the photometric element 7. When a criterion potential is exceeded by the potential of the condenser 75, an emission stop signal from the comparator is inputted into the flash control circuit 29 from the comparator 58 to stop the flash.

Figure 33:
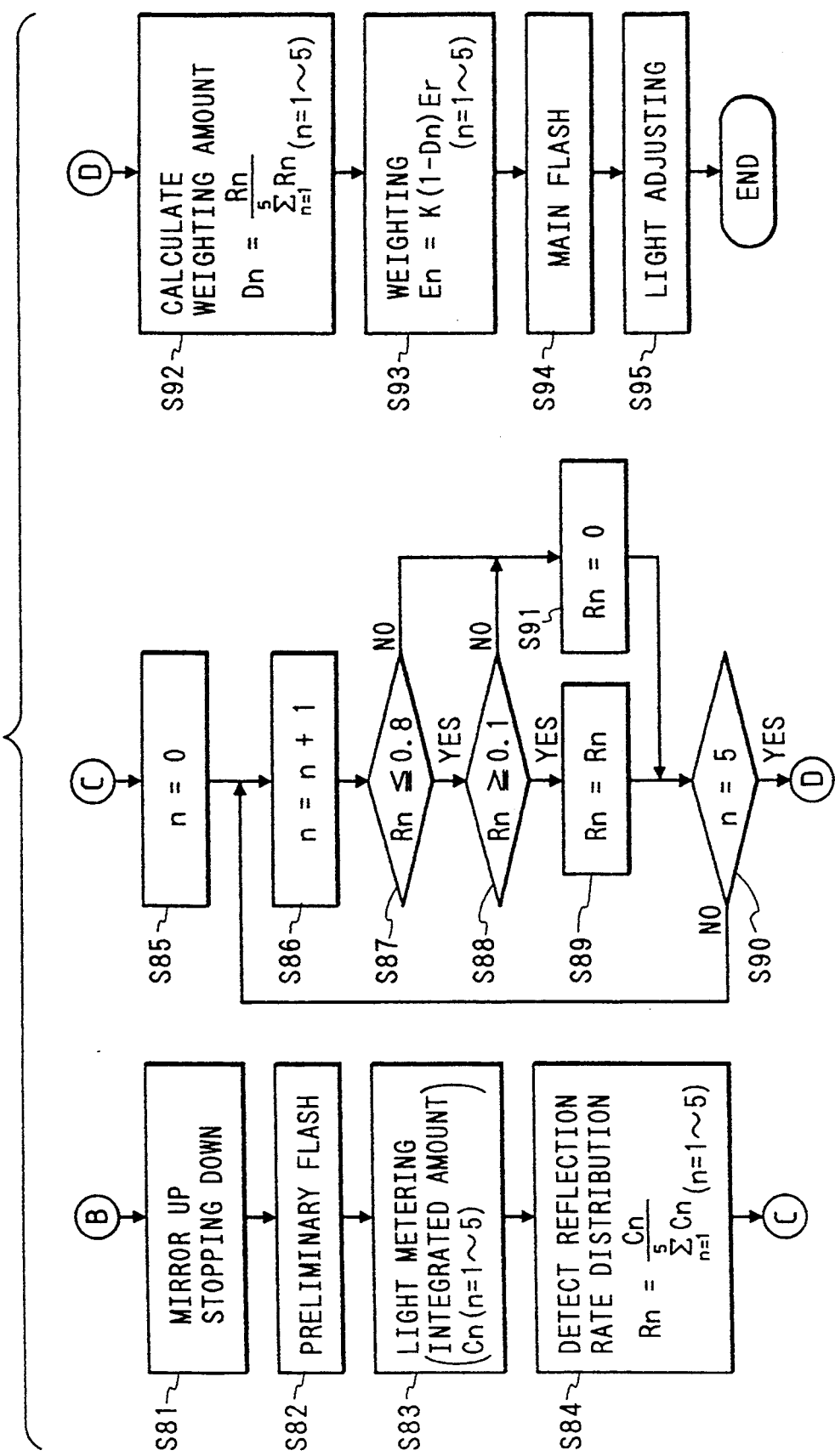

When it is seen as AV≦AVx at step S59 in FIG. 31, i.e., if the determined aperture value AV is closer to the opened aperture value than the predetermined aperture value AVx is, the program proceeds to step S81 as shown in FIG. 33. In procedure at step S81 and thereafter, the reflection distribution of the object field is assumed from the reflected light of a preliminary flash to be carried out, and a light adjusting is performed by accordingly setting weighting amounts for the outputs of the light adjusting photometric element 7.

At step S81, the mirror 10 is up and the aperture 25 is stopped down, and then at step S82 the microcomputer 69 provides a preliminary flash signal to the flash control circuit 29 to perform a preliminary flash. The reflected light from the object body due to the preliminary flash is reflected at the shutter blind surface 17 through the photographing lens LE and reaches to the light adjusting photometric element 7 through the photometric lens 8. As described above, the element surface of the light adjusting photometric element 7 is segmented into five regions, and it meters the light by segmenting the object field into five regions. Photometric outputs corresponding to the quantity of the reflected light from the object body are integrated at the integration circuits 73a~73e, and, at step S83, the integrated signals are entered into the microcomputer 69, whereby the reflection rate distribution is calculated by the following formula as:

$$Rn = \frac{Cn}{\sum_{n=1}^{5} Cn}$$

where n=1~5.

At steps S85 to S91, regions at which reflection rate distribution Rn (n=1~5) is very high (Rn>0.8) and regions at which it is very low (Rn<0.1) are extracted and are cut out. Existence of photometric regions with very high Rn means that there are behind the subject (person) for example a gold-leafed folding screen or a white wall. Also, an existence of photometric regions with very low Rn means for example that the background of the subject (person) is such as a landscape which causes a kind of emptiness. In either case, these regions are cut out because they may be the factor adversely affecting the TTL light adjusting. In other words, the reflection rate distributions Rn (n=1~5) for the regions to be cut out are replaced by 0 so that they do not contribute to the subsequent calculation.

When cutting outs of both high and low luminances are completed with respect to the whole region of the light adjusting photometric element 7, the program proceeds to step S92 at which weighting amounts Dn are obtained, by using the reflection rate distributions Rn (n=1~5) after the cutting out, from the following formula:

$$Dn = \frac{Rn}{\sum_{n=1}^{5} Rn}$$

Then, at step S93, the weighting amounts Dn are converted into voltage values En on the basis of the formula (3) and are entered into the weighted light adjusting circuit 28.

Subsequently, at step S94, the microcomputer 69 causes the flash apparatus 16 to emit a main flash by supplying a an emission start signal to the flash control circuit 29. At this time, the main mirror 10 is in its mirror up state and the aperture 25 of the lens is stopped down to the photographing aperture value so that the reflected light of the main flash from the object body reaches the light adjusting photometric element 7 through the lens LE by the route as described above, and the reflected light of the main flash from the object is metered in five segments. Photometric outputs from the light adjusting photometric element 7 are weighted at the timing of step S95 in a weighted light adjusting circuit 28 and are then integrated by the condenser 75. And, when the integrated amount of the five regions exceeds a criterion value, the emission stop signal is supplied from the comparator 58 to the flash control circuit 29 to stop the emission. Therefore, if the reflection rate for the center region 7c is higher than those for the other peripheral regions, photometric outputs of the peripheral regions contribute more to the detection of light quantity than the photometric output of the center region. If the reflection rate distribution for the center region 7c is higher than a predetermined value or is lower than a predetermined value, the photometric output of that region does not contribute the detection of light quantity. As a result, an appropriate light adjusting is possible even when for example the reflection rate of the object is very high.

On the other hand, if it is decided at step S52 in FIG. 31 that the flash apparatus 16 is not to be used, an exposure value BV is determined at step S60 by using luminance value BVn in accordance with the algorithm for an usual photographing. Then, at step S61, the ISO information and exposure mode are read and furthermore at step S62 the shutter speed TV and the aperture value AV are determined. Subsequently, at step S63, the mirror up and the stopping down of the aperture 25 are effected, and, at step S64, a photographing is carried out.

In the configuration of the embodiment as above, the flash apparatus 16 constitutes flash means; the light adjusting photometric element 7 constitutes photometric means; the microcomputer 69 constitutes weighting amount calculation means; the condenser 75, the criterion power source 76 and the comparator 58 of the weighted light adjusting circuit 28 constitute light adjusting means; the microcomputer 69 constitutes decision means; the microcomputer 69 and the flash control circuit 29 constitute flash control means; and the exposure control circuit 68 constitutes aperture value setting circuit.

In the embodiment as above, when a programmed exposure mode is used, a set aperture value is limited by a predetermined aperture value because of the following reasons. With an aperture priority mode or with a manual mode, an intended photographing effect may not be obtained if a set aperture is restricted to be larger than a predetermined aperture value, because a small aperture value may be intentionally set by the camera user. Since, however, a consideration for such photographing effect is not required with the programmed exposure mode, the aperture value is restricted to be larger than a predetermined value so as to carry out more accurate light adjusting. The aperture value may also be controlled on a programmed line figure.

Although in the above a weighting amount is calculated for each region of the light adjusting photometric element 7 so that a photometric output of each region is respectively corrected, it is not necessary to carry out weighting correction for each region. It is also possible to bring some regions into a group where a weighting amount may be calculated for each group for the correction. In either way, the method of correction may be any method as far as the correction is to be made in accordance with the reflection rate distribution of the object field. Further, the exposure mode can be any mode, though a description has been given above for a camera with four exposure modes.

According to the fifth embodiment of the present invention, weighting amounts related to the reflection rate distribution of the object field are calculated on the basis of photometric outputs of the light adjusting photometric element at the time of a preliminary flash only when the aperture valued is less than a predetermined aperture value, and the light adjusting photometric outputs which are corrected in accordance with thus obtained reflection rate distribution are respectively integrated at the time of main flash so that the flash is caused to stop when a criterion value is exceeded by the integrated value. Therefore, an appropriate exposure is possible under any photographing condition regardless of the subject even when the photographer intentionally sets a small aperture value. In the case of small aperture, even more appropriate light adjusting is possible if the photometric elements are corrected in accordance with a predetermined reflection rate distribution. Furthermore, with a programmed exposure mode, an appropriate light adjusting is possible for any subject if a preliminary flash is carried out without exception by restricting the set aperture value at a predetermined aperture value and the photometric outputs are corrected on the basis of the reflection rate distribution obtained at that time.

Figure 34:
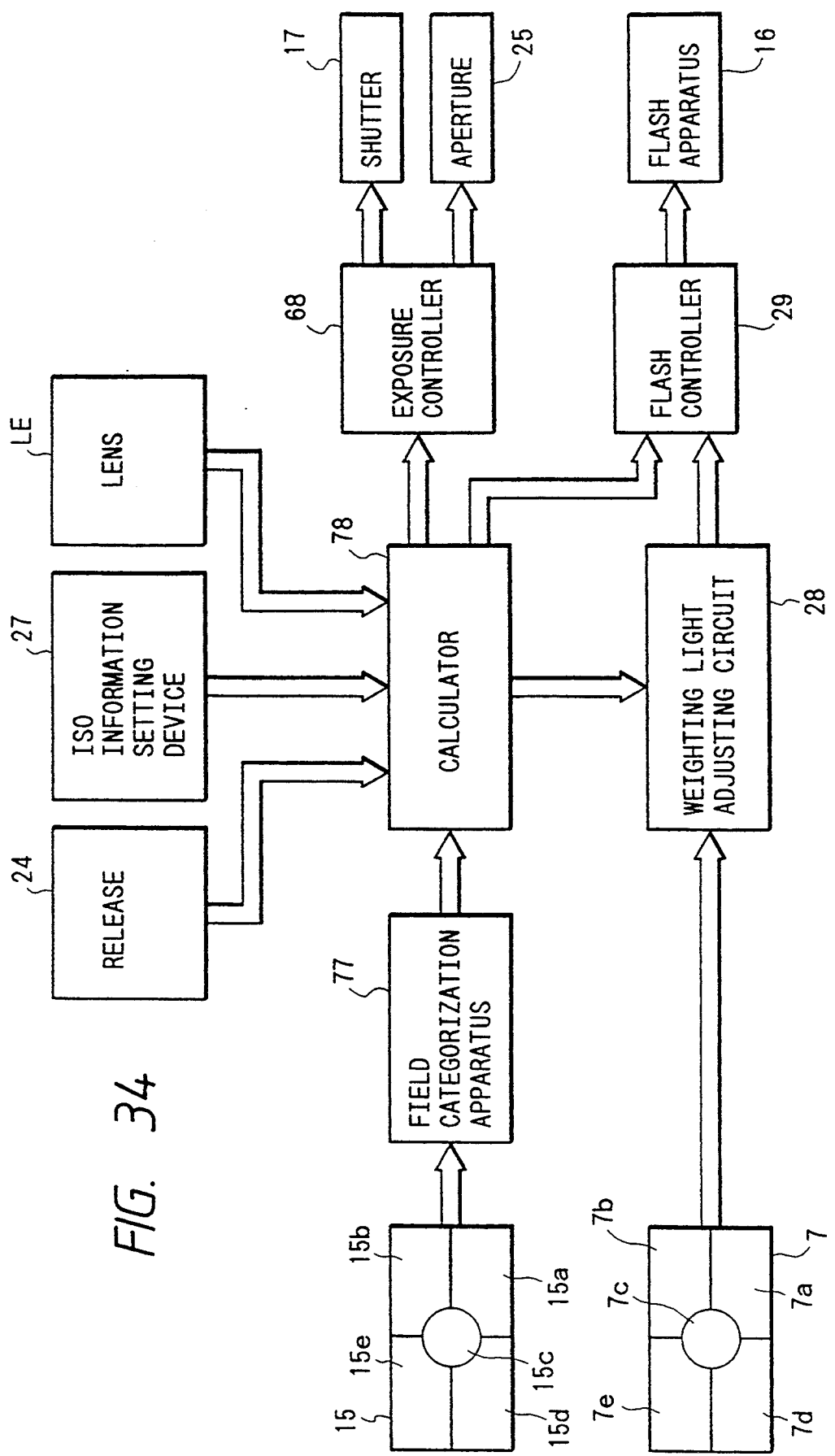
FIG. 34 is a block diagram of a camera according to the present invention.

FIG. 34 is a block diagram of a camera according to a sixth embodiment of the present invention. Photometric element 15 (a first photometric means) is constituted by five regions 15a~15e, and provides photometric outputs by segmenting the object field into five regions when the flash apparatus is not flashed. Its position in the camera is almost the same as that of the first photometric means as shown in FIG. 4.

Five outputs of this photometric element 15 are inputted into a field categorization apparatus 77. This field categorization aparats 77 categorizes the field into two patterns, "bright" or "dark". Note that its detail will be described later by way of FIG. 35.

A calculator 78 determines the extent of weighting at the time of TTL light adjusting (main flash), in accordance with an algorithm which will be described later by way of FIGS. 36 and 37, and outputs the result to the weighted light adjusting circuit 28. Also, from five outputs of the photometric element 15, an appropriate exposure value is calculated by means of the calculator 78 and is transmitted to exposure control means 68 where controlling for a shutter 17 and an aperture 25 are carried out.

Further, photometric element 7 (second photometric means) is also constituted by five regions 7a~7e and measures the reflected light from the object field by segmenting the object field into five regions when the flash means 16 are caused to flash. Its position in the camera is almost the same as that of the second photometric element 7 as shown in FIG. 4. This photometric element 7 is positioned such that the object field segmented by its five regions corresponds to the object field segmented by the five regions of the photometric element 15.

Flash means 16 is controlled by flash control means 29 and carries out preliminary flash and main flash.

Figure 35:
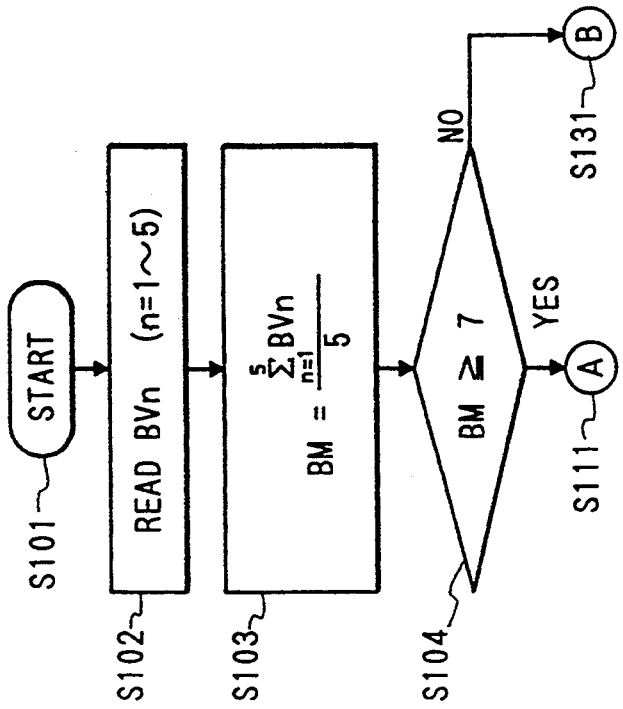
FIG. 35 is a flowchart explaining the algorithm to be carried out in the field categorization apparatus as shown in FIG. 34.

Next, the operation will be described in detail by way of FIGS. 35~38. FIG. 35 shows an example of algorithm for the field categorization means 77; FIGS. 36 and 37 show examples of algorithm for the calculation means 78; and FIG. 38 show an example of circuit for the weighted light adjusting circuit 28. And, each of the above described means is controlled by a micro computer.

Referring first to FIG. 35, the operation of the field categorization means 77 is described. At step S101 (hereinafter "step" is omitted), when release button 24 is turned on, the program proceeds to S102 at which luminance values BVn (n=1~5) of the five outputs of the photometric element 15 are read. Then, at S103, an average luminance value BM is calculated from these as follows:

$$BM = \frac{\sum_{n=1}^{5} BVn}{5}$$

At S104, it is seen if the average luminance value BM exceeds 7. The program proceeds to S111 when BM≧7 while it proceeds to S131 when BM<7.

Figure 36:
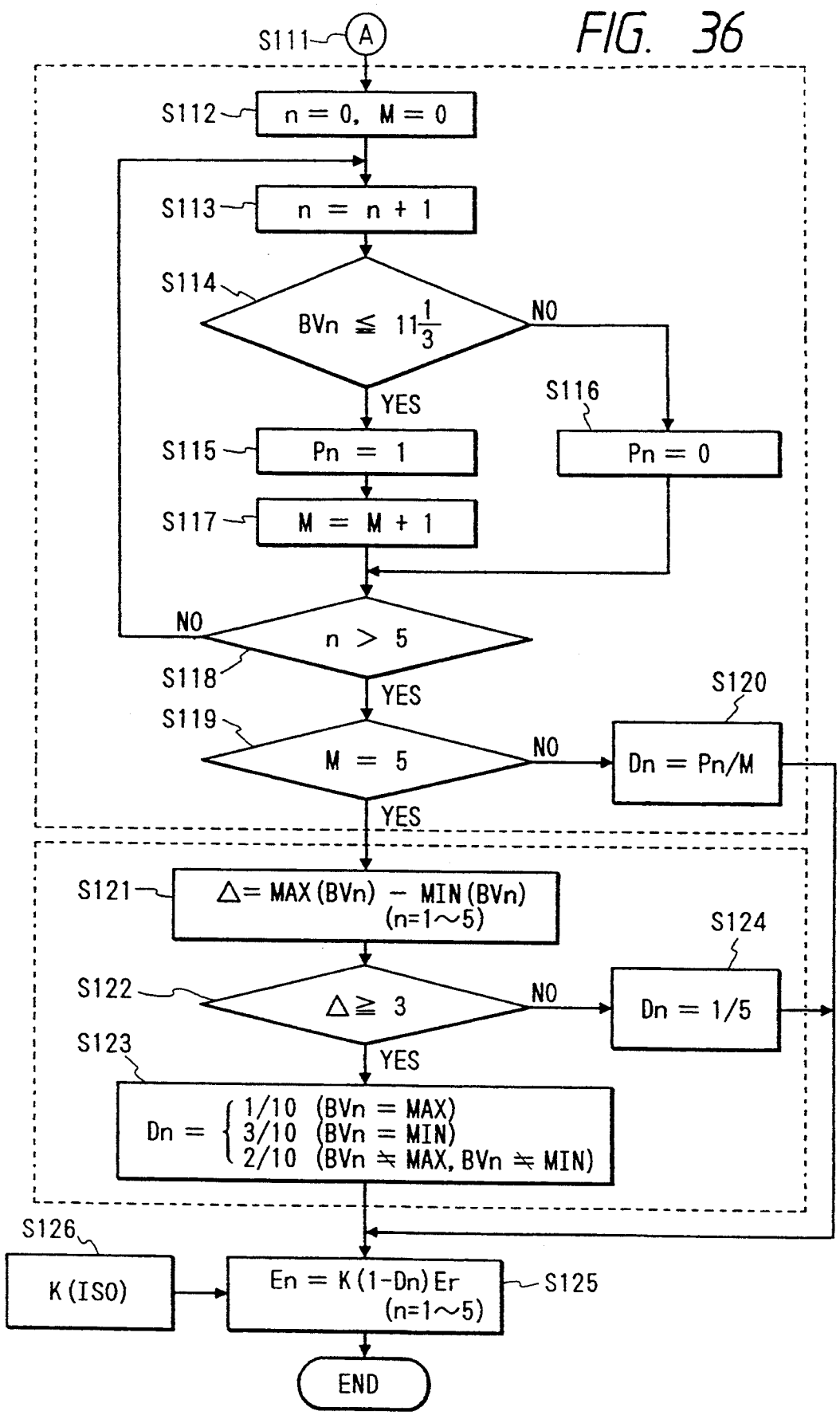
FIG. 36 and FIG. 37 are flowcharts explaining the algorithm to be carried out in the calculator as shown in FIG. 34.
Figure 37:
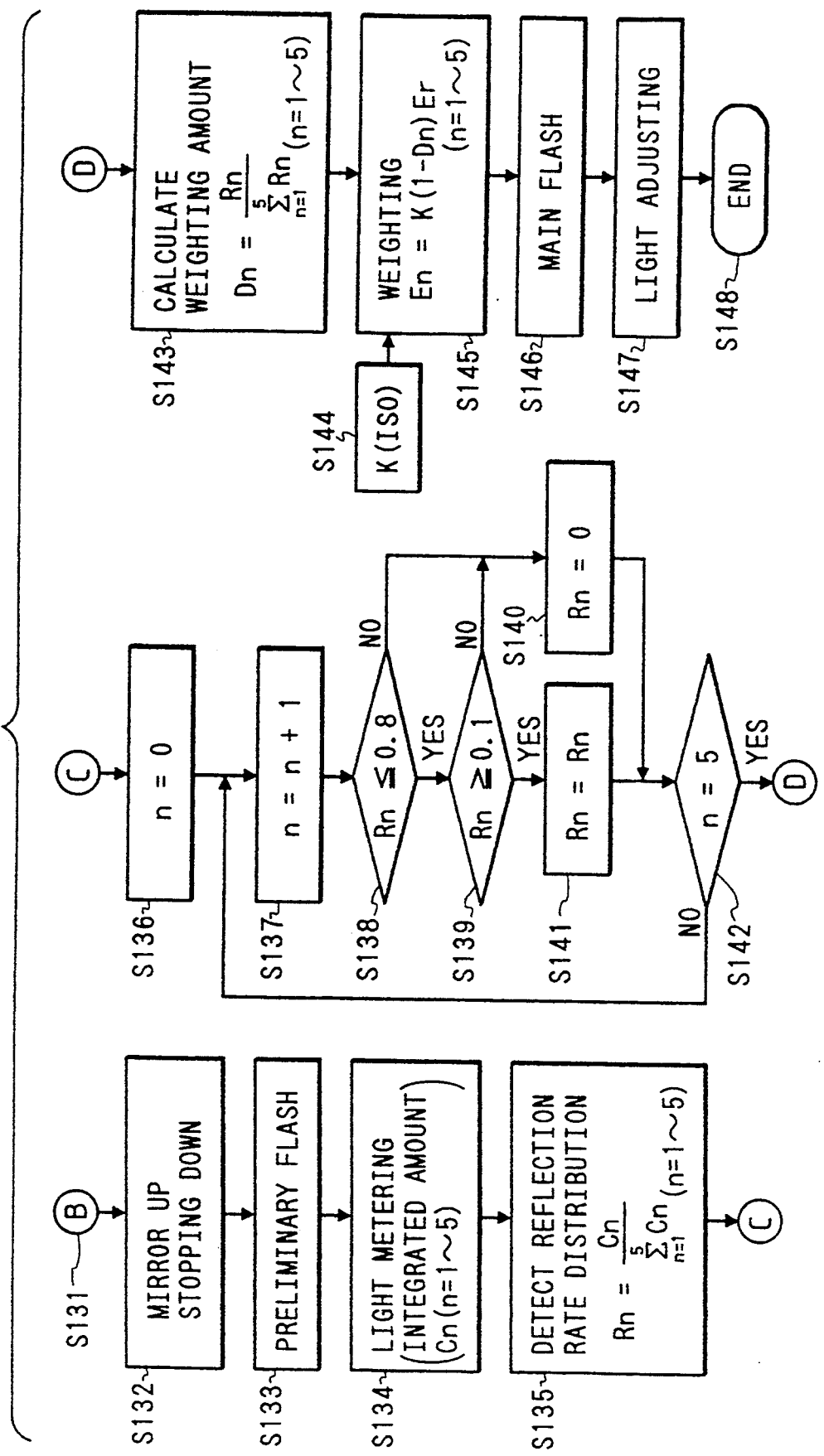
Figure 38:
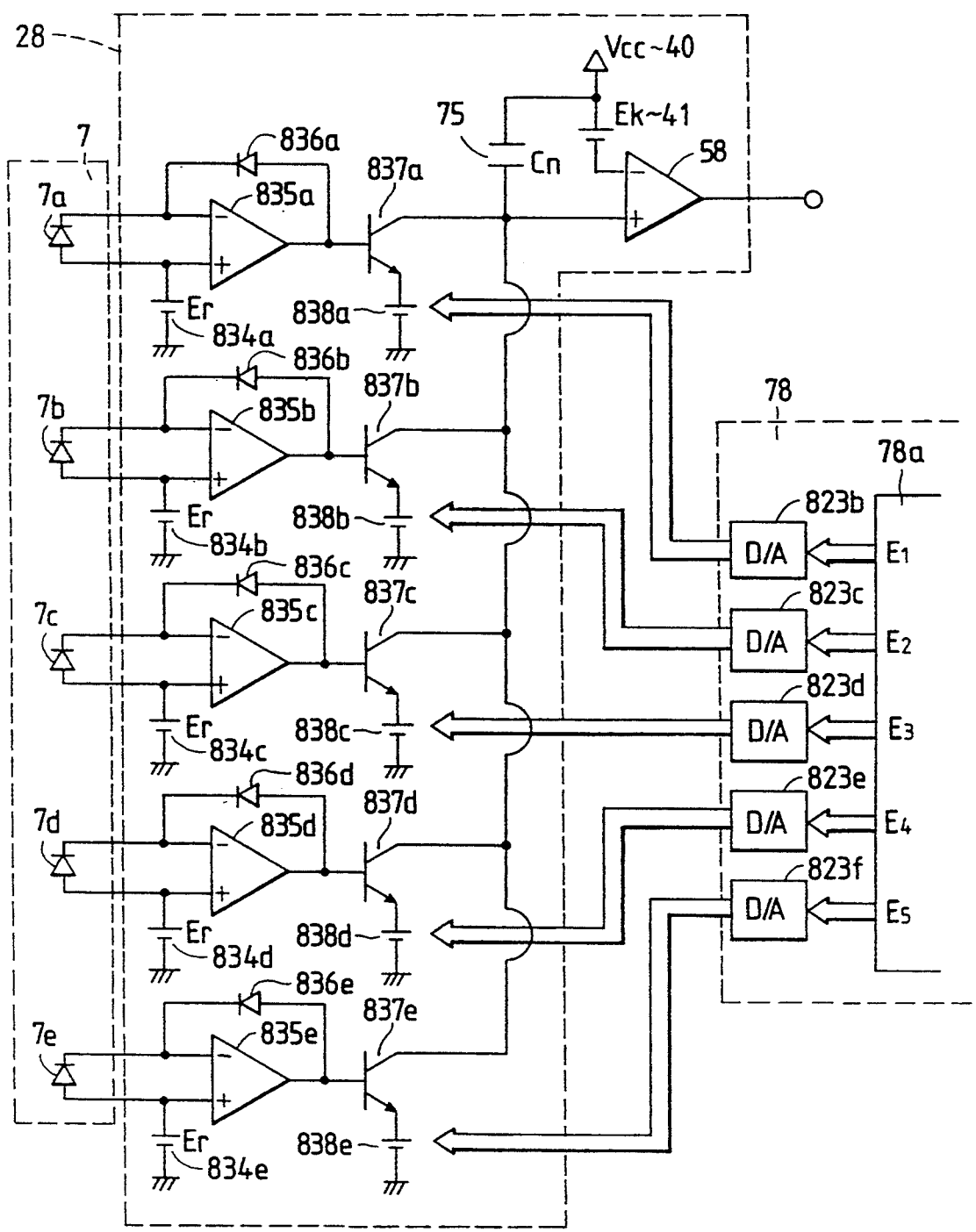
FIG. 38 is a circuit diagram showing in detail the weighting light adjustment circuit as shown in FIG. 34.

Then, when luminance condition of the object field is determined as above by the field categorization means the calculation means 38 accordingly performs controlling as shown in FIG. 36 and FIG. 37.

FIG. 36 shows a case of proceeding to Sill.

Initial values of n, M are set as 0 at Sl12 and n=n+1 is set at S113.

Then, at S114, a comparison is made between BVn and $11\frac{1}{3}(BV)$. If $BVn \leq 11\frac{1}{3}(BV)$, Pn=1 is set at S115 and M=M+1 is set at S117. This M is to represent the number among five BVn which are not more than $11\frac{1}{3}$.

If $BVn > 11\frac{1}{3}(BV)$, Pn=0 is set at S116. Until n exceeds 5 at S118, the above routine S113 to S118 is repeated.

When n exceeds 5, a comparison is made between M and 5 at S119. If M=5, it is a case where there is no very high luminance output exceeding $11\frac{1}{3}(BV)$ among BVn, and the program proceeds to a large luminance difference block which consists of S121~S124.

If M≠5 at S119, it is a case where one or more very high luminance outputs exceeding $11\frac{1}{3}(BV)$ among BVn, and the program thus proceeds to S120 at which the extent of weighting Dn is determined. At S120, a calculation, Dn=Pn/M, is performed, where weights Dn corresponding to the photometric regions which have provided very high luminance exceeding $11\frac{1}{3}(BV)$ are set as 0 while weights for the other regions may be obtained as:

Dn=1 / (number of regions not exceeding $11\frac{1}{3}(BV)$).

And this result is sent to S125.

Through the large luminance difference block consisting of S121~S124, the maximum luminance difference A among the five outputs is calculated at S121 as:

Δ=MAX (BVn)−MIN(BVn), and a comparison is made at S122 between Δ and 3. If Δ<3, i.e., when the maximum luminance difference Δ is small, the program proceeds to S124 at which the weights are set as Dn =1/5 for all five outputs and this result is sent to S125. If on the other hand Δ≧3, i.e., when the maximum luminance difference is large, the program proceeds to S123 at which the weight corresponding to the highest luminance (BVn=MAX) among the five outputs is set as Dn=1/10, the weight corresponding to the lowest luminance (BVn=MIN) is set as Dn=3/10, and the weights for the three remaining outputs are all set as Dn=2/10 and the result it sent to S125.

At S125, voltage values En corresponding to weights Dn as described above are calculated in accordance with the formula: En=K (1-Dn) Er. K is the value corresponding to the ISO information to be inputted at S126, and Er is a predetermined constant voltage detail of which will be described later with reference to FIG. 38.

FIG. 37 shows the case of proceeding to S131 because the object field has been categorized as dark by the field categorization means as shown in FIG. 35. At S132, mirror up of the mirror 10 (see FIG. 4) and stropping down of the aperture 25 are carried out. The program then proceeds to S133 at which a preliminary flash by the flash means 16 is effected so that the reflected light from the object body due to the preliminary flash passes through the photographing lens LE (FIG. 4), is reflected at the shutter blind surface 17 (FIG. 4), passes through the photometric lens 8 (FIG. 4) and reaches the photometric element 7 disposed at the position of the photometric means 7 (FIG. 4). The element surface of the photometric element 7 is segmented into five regions 7a~7e and carries out photometry by segmenting the object field into five regions.

At S134, an integrated amount Cn is obtained for a photometric output of each photometric region in the photometric element 7.

At S 135, the reflection rate distribution Rn of the object field is detected from the following formula as:

$$Rn = \frac{Cn}{\sum_{n=1}^{5} Cn} \quad (n = 1 \sim 5).$$

At S136 to S142, regions at which reflection rate distribution Rn is very high (Rn>0.8) and regions at which that is very low (Rn<0.1) are extracted and are cut out. Photometric regions with very high reflection rate distribution Rn are cut out because there is presumably behind the subject (person) an object such as a gold-leafed folding screen or a white wall which adversely affect the TTL light adjusting. Also, photometric regions with very low reflection rate distribution Rn represent a case where background of the subject (person) is for example a landscape causing an emptiness which is also presumably a factor adversely affecting the TTL light adjusting.

Upon such cutting out, the reflection rate distribution Rn (n=1~5) for the cut out regions are replaced by 0 and do not contribute to the subsequent calculations.

At S143, weights Dn are calculated on the basis of the reflection rate distributions Rn (n=1~5) after the cutting out as:

$$Dn = \frac{Rn}{\sum_{n=1}^{5} Rn} \quad (n = 1 \sim 5).$$

Then, the program proceeds to S144 and S145 at which the above described weights Dn are correspondingly converted into voltages En as:

$$En = K(1-Dn)Er, \text{ and}$$

are inputted to the weighted light adjusting circuit 28. K is the value corresponding to the ISO information to be inputted at S114, and Er is a predetermined constant voltage detail of which will be described later with reference to FIG. 38.

When the voltages En corresponding to the weight amounts are inputted into the weighted light adjusting circuit 28, at S146, a main flash by the flash means 16 is carried out. At this time, the main mirror 11 is in its mirror up state and the aperture 25 of the lens is stopped down to the photographing aperture value. The reflected light of the main flash from the object body passes through the lens LE (FIG. 4), is reflected at the film surface FI (FIG. 4), passes through the photometric lens 8 (FIG. 4) and reaches the photometric element 7 as shown in FIG. 4. The photometric element 7 is segmented into five regions 7A~7e and adjust the reflected light of the main flash from the object field by segmenting into five regions. Note that the segmenting configuration of the object field by the photometric element 7 is caused to generally correspond to the segmenting configuration of the object field by the photometric element 15.

The reflected lights measured in segments at the photometric element 7 are weighted at S147 by the weighted light adjusting circuit 28 and then integrated. And, when the total of the integrated amounts for the five regions has reached a predetermined amount, an emission stop signal is provided, whereby the emission of the flash apparatus 16 is caused to stop via the flash control apparatus 29, and the program then proceeds to S148 where it ends.

A circuit diagram for the weighted light adjusting circuit 28 will now be described by way of FIG. 38.

When lights are incident on five photodiodes 7a~7e which constitute the second photometric means 7, potentials corresponding to such quantities are outputted from OP-amps 835a~835e and are applied to the bases of the transistors 837a~837e. Then, while collector currents flow in from Vcc 40 via the condenser 75, such amounts are changed by the potentials of the variable power source 838a~838e. The potentials of these variable power sources 838a~838e are set from the voltage values En outputted from the CPU portion 78a of the the calculation means 78 as described above via D/A converters 823b~823f. For example, when the portion 15a of the first photometric means 15 is of very high luminance exceeding BV=11⅓, D1 becomes 0 where a large value is set as E1. Then, the amount of collector current flowing into the transistor 837a becomes small which as a result does not contribute very much to the charge cumulation at the condenser 75. Comparator 58 is designed to provide the emission stop signal to the flash control means 29 when the potential at the non-reversible input terminal side has exceeded the criterion potential at the reversible input terminal side. Therefore, the fact that it does not contribute very much to the charge cumulation at the condenser 75 means that the output from the photodiode 7a is assigned with a low weight so that the effect of very high luminance is removed. Photodiodes 7b~7e are as shown in the figure respectively provided with a circuit which is identical to the circuit consisting of 834a~838a, and each of these circuits is integrated with a collector of the transistor 837 so as to be connected to the condenser 75. Accordingly, the photodiode output of a region to which a high weight is assigned is more likely to contribute to the charge cumulation at the condenser 75 and predominantly determines the timing at which the emission stop signal is to be provided.

Figure 39:
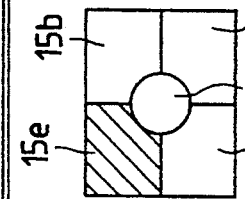
FIG. 39 is a view showing examples of element pattern combination of the primary and secondary light meters.

FIG. 39 shows ~examples of element pattern combinations of the first and second photometric elements. Case 1, identical to the embodiment as shown in FIG. 34, indicates the fact that, when the oblique line portion 15e is of high luminance, it suffices to assign a low weight to the output of the corresponding oblique line portion 7e, i.e., to lower the contribution of the output of the photodiode 7e to the light adjusting operation of the flash apparatus. Further, it is also possible to prohibit the output of the photodiode 7e so as to remove the effect of the oblique line portion 15e.

In Case 2, while the first photometric means is of a five-segmented type, the second photometric means is of a two-segmented type and only the center portions 79c and 80a correspond to each other. In this case, when any of the peripheral portions (79e for example) is of very high luminance, the weight for the whole peripheral portion 80b is reduced at the time of TTL light adjusting. Such a combination is useful when the photometric optical system of the second photometric means cannot segment the object field very accurately Case 3 shows an example where the first photometric means is not of a segmented photometry type. It is thereby shown that, when the first photometric means has detected a very high luminance, the peripheral portion 82b at which the main object is less likely to exist is assigned with a lower weight.

In case 4, while the first photometric means is of five-segmented type, the second photometric means is segmented into three regions. This shows that, when the portion 83e has detected a very high luminance, the whole of the upper peripheral portion 84b is to be assigned with a low weight. Such a combination is effective when the photometric optical system of the second photometric means side watches the film surface from a substantially oblique position as shown in FIG. 4 or when the object field can be accurately divided into top and bottom while it cannot be divided very accurately into left and right.

While the embodiments of cameras according to the present invention have been described by way of the drawings, it is to be understood that the scope of the present invention is not limited to the embodiments as described above and various changes and modifications are naturally possible without departing from the spirit thereof.

According to the sixth embodiment of the present invention, the object field is categorized by the field categorization means, and, when the object field is categorized as bright, regions at which high luminance exists are extracted by measuring the steady light so that such regions are assigned with low weights or cut out at the time of light adjusting for the main flash. Thus a TTL light adjusting is possible with a suitable light emission. Also, while, at the time of photographing at a luminous scene, the metering of the preliminary flash becomes difficult in terms of quantity because the aperture is reduced in size and the ratio of the flash to the steady light is also reduced, the problem at a luminous scene may be eliminated, without a preliminary flash, by employing the system as described above When it is categorized as dark, a preliminary flash is carried out by the flash means and the reflected light therefrom is measured to detect the reflection rate distribution for the object field. Then, regions which presumably cause an adverse effect for the TTL light adjusting are extracted, and these regions are cut out or assigned with lower weights at the time of light adjusting for the main flash. Thereby, a TTL light adjusting with a suitable light emission is possible also in this case.

Since, in this way, the camera automatically categorizes the object field by the field categorization means and automatically selects a method of weighting for the light adjustment from a steady light system and a preliminary flash system, an appropriate flash emission may be carried out for all the regions, from bright to dark.

I claim:

1. A light emission control apparatus comprising:
   a flash device capable both of a preliminary flash to be emitted before a flash photographing and of a main flash to be emitted for the flash photographing;
   a light adjusting device having segmented light adjusting elements, for controlling a light emission of said flash device based on outputs from said light adjusting elements;
   a photometric device for measuring light from an object field;
   a field categorization device for categorizing a luminance value condition of said object field at least into a first condition and a second condition by using outputs from said photometric device; and
   a calculation device for prohibiting a preliminary flash of said flash device and for carrying out weighting for the outputs of said segmented light adjusting elements based on the outputs from said photometric device when said object field is categorized as in said first condition by said field categorization device, and for effecting a preliminary flash of said flash device and for carrying out weighting for the outputs of said segmented light adjusting elements based on the outputs from said photometric device when said object field is categorized as in said second condition.

2. A light emission control apparatus according to claim 1, wherein said photometric device comprises a segmented photometric system.

3. A light emission control apparatus according to claim 16, wherein said field categorization device discriminates an object field as in said first condition when the average of the luminance values for the outputs of said photometric device is at least a predetermined value but otherwise discriminates an object field as in said second condition.

4. A light emission control apparatus according to claim 2, wherein said field categorization device carries out a categorization by using an average of two or more luminance values among a plurality of luminance values measured in segments by said photometric device.

* * * * *